United States Patent
Kilpatrick, II et al.

(10) Patent No.: US 9,763,252 B2
(45) Date of Patent: Sep. 12, 2017

(54) ADAPTING MOBILE DEVICE BEHAVIOR USING PREDICTIVE MOBILITY

(71) Applicant: QUALCOMM Incorporated, San Diego, CA (US)

(72) Inventors: Thomas Kilpatrick, II, San Diego, CA (US); Olufunmilola Awoniyi-Oteri, San Diego, CA (US); Amir Sarajedini, San Diego, CA (US); Roy Franklin Quick, Jr., San Diego, CA (US); Patrik Nils Lundqvist, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/244,339

(22) Filed: Apr. 3, 2014

(65) Prior Publication Data

US 2015/0038156 A1 Feb. 5, 2015

Related U.S. Application Data

(60) Provisional application No. 61/860,789, filed on Jul. 31, 2013.

(51) Int. Cl.
*H04B 1/38* (2015.01)
*H04W 72/00* (2009.01)
(Continued)

(52) U.S. Cl.
CPC ........ *H04W 72/0473* (2013.01); *H04W 8/08* (2013.01); *H04W 36/0055* (2013.01);
(Continued)

(58) Field of Classification Search
None
See application file for complete search history.

(56) References Cited

U.S. PATENT DOCUMENTS

| 5,428,816 A | 6/1995 | Barnett et al. |
| 5,884,147 A | 3/1999 | Reudink et al. |

(Continued)

FOREIGN PATENT DOCUMENTS

| EP | 1071304 A1 | 1/2001 |
| EP | 2214439 A1 | 8/2010 |

(Continued)

OTHER PUBLICATIONS

Chandra et al., "Determination of Optimal Handover Boundaries in a Cellular Network Based on Traffic Distribution Analysis of Mobile Measurement Reports," 1997 IEEE 47th Vehicular Technology Conference, May 4-7, 1997, Phoenix, AZ, pp. 305-309, vol. 1, ISBN 0-7803-3659-3, Institute of Electrical and Electronics Engineers.

(Continued)

*Primary Examiner* — Moustapha Diaby
(74) *Attorney, Agent, or Firm* — Holland & Hart, LLP

(57) ABSTRACT

Methods, systems, and devices are described for adjusting at least one channel parameter based on accessed historical channel information associated with mobility patterns of a mobile device. In some examples, a mobile device or a base station may access historical channel information associated with mobility patterns of the mobile device or another mobile device. The mobility patterns may include information relative to a particular time and location of a mobile device, a previously traveled route by a mobile device, etc. Based on the historical channel information associated with the mobility patterns, the mobile device or the base station may adjust a channel parameter to improve communication performance across the particular channel.

23 Claims, 15 Drawing Sheets

(51) Int. Cl.

| | | |
|---|---|---|
| *H04W 72/04* | (2009.01) | |
| *H04W 36/32* | (2009.01) | |
| *H04W 36/04* | (2009.01) | |
| *H04W 36/24* | (2009.01) | |
| *H04W 64/00* | (2009.01) | |
| *H04W 72/02* | (2009.01) | |
| *H04W 8/08* | (2009.01) | |
| *H04W 68/02* | (2009.01) | |
| *H04W 36/00* | (2009.01) | |
| *H04W 36/10* | (2009.01) | |
| *H04W 52/22* | (2009.01) | |
| *H04W 52/32* | (2009.01) | |
| *H04W 74/08* | (2009.01) | |
| *H04W 52/50* | (2009.01) | |
| *H04W 60/00* | (2009.01) | |
| *H04W 52/28* | (2009.01) | |
| *H04W 52/36* | (2009.01) | |

(52) U.S. Cl.
CPC ........... *H04W 36/04* (2013.01); *H04W 36/10* (2013.01); *H04W 36/245* (2013.01); *H04W 36/32* (2013.01); *H04W 52/22* (2013.01); *H04W 52/325* (2013.01); *H04W 52/50* (2013.01); *H04W 64/00* (2013.01); *H04W 64/006* (2013.01); *H04W 68/02* (2013.01); *H04W 72/02* (2013.01); *H04W 72/048* (2013.01); *H04W 74/0833* (2013.01); *H04W 52/223* (2013.01); *H04W 52/228* (2013.01); *H04W 52/285* (2013.01); *H04W 52/362* (2013.01); *H04W 60/00* (2013.01)

(56) References Cited

U.S. PATENT DOCUMENTS

| | | | |
|---|---|---|---|
| 5,943,621 A | 8/1999 | Ho et al. | |
| 6,909,893 B2 | 6/2005 | Aoki et al. | |
| 7,224,973 B2 | 5/2007 | Tsutazawa et al. | |
| 7,912,490 B2 | 3/2011 | Pietraski | |
| 7,925,205 B2 | 4/2011 | Kennedy, Jr. et al. | |
| 7,929,979 B2 | 4/2011 | Konno | |
| 8,121,784 B2 | 2/2012 | Templeton et al. | |
| 8,134,970 B2 | 3/2012 | Jalil et al. | |
| 8,185,057 B2 | 5/2012 | Molnar et al. | |
| 8,185,159 B2 | 5/2012 | Itamiya et al. | |
| 8,208,473 B2 | 6/2012 | Larsen et al. | |
| 8,331,929 B2 | 12/2012 | Brisebois et al. | |
| 8,345,632 B2 | 1/2013 | Mildh et al. | |
| 8,472,982 B1 | 6/2013 | Oroskar et al. | |
| 8,537,751 B2 | 9/2013 | Nylander et al. | |
| 8,712,443 B2 | 4/2014 | Konno | |
| 9,008,063 B2 | 4/2015 | Cui et al. | |
| 9,084,181 B2 | 7/2015 | Brisebois | |
| 9,198,160 B2 | 11/2015 | Bienas et al. | |
| 9,226,197 B2 | 12/2015 | Cui et al. | |
| 2001/0006514 A1 | 7/2001 | Park | |
| 2004/0017310 A1 | 1/2004 | Vargas-Hurlston et al. | |
| 2004/0085909 A1* | 5/2004 | Soliman | H04W 24/02 370/252 |
| 2004/0142698 A1* | 7/2004 | Pietraski | 455/452.2 |
| 2004/0192341 A1* | 9/2004 | Wang | H04W 28/26 455/456.1 |
| 2004/0213174 A1* | 10/2004 | Engels | H04L 1/0003 370/328 |
| 2005/0255870 A1 | 11/2005 | Chang et al. | |
| 2005/0277415 A1 | 12/2005 | Hamalainen et al. | |
| 2005/0288019 A1 | 12/2005 | Park et al. | |
| 2006/0039318 A1* | 2/2006 | Oh et al. | 370/328 |
| 2006/0227744 A1 | 10/2006 | Metke et al. | |
| 2007/0140157 A1 | 6/2007 | Fu et al. | |
| 2007/0142050 A1 | 6/2007 | Handforth et al. | |
| 2007/0149235 A1 | 6/2007 | Chin et al. | |
| 2007/0246045 A1 | 10/2007 | Hoffman | |
| 2008/0004032 A1* | 1/2008 | Lironi | H04L 1/0002 455/452.2 |
| 2008/0025257 A1* | 1/2008 | Laroia | H04L 1/007 370/329 |
| 2008/0031194 A1 | 2/2008 | Yaqub | |
| 2008/0119209 A1 | 5/2008 | Upp | |
| 2008/0220784 A1 | 9/2008 | Somasundaram et al. | |
| 2008/0240030 A1* | 10/2008 | Kolding et al. | 370/329 |
| 2009/0131066 A1* | 5/2009 | Barve | H04L 1/0026 455/452.2 |
| 2009/0232089 A1 | 9/2009 | Lott | |
| 2009/0268689 A1 | 10/2009 | Fu et al. | |
| 2009/0318199 A1 | 12/2009 | Barreto et al. | |
| 2010/0057485 A1 | 3/2010 | Luft | |
| 2010/0081455 A1 | 4/2010 | Teasdale et al. | |
| 2010/0211305 A1 | 8/2010 | Miyata | |
| 2010/0267378 A1 | 10/2010 | Hamabe et al. | |
| 2010/0272050 A1 | 10/2010 | Lim et al. | |
| 2010/0309793 A1* | 12/2010 | Choi | H04L 1/0016 370/252 |
| 2011/0124334 A1* | 5/2011 | Brisebois et al. | 455/434 |
| 2011/0177819 A1 | 7/2011 | Kitahara | |
| 2011/0223965 A1 | 9/2011 | Miklos et al. | |
| 2011/0244859 A1 | 10/2011 | Tsuda | |
| 2012/0039305 A1 | 2/2012 | Han et al. | |
| 2012/0071173 A1 | 3/2012 | Olsson et al. | |
| 2012/0076056 A1 | 3/2012 | Tillman et al. | |
| 2012/0082198 A1* | 4/2012 | Zhang | H04B 7/0617 375/224 |
| 2012/0282925 A1 | 11/2012 | Wehmeier et al. | |
| 2012/0328059 A1 | 12/2012 | Balraj et al. | |
| 2013/0012189 A1* | 1/2013 | Hamabe | H04W 24/10 455/422.1 |
| 2013/0030873 A1 | 1/2013 | Davidson | |
| 2013/0039194 A1 | 2/2013 | Siomina et al. | |
| 2013/0079010 A1 | 3/2013 | Brisebois et al. | |
| 2013/0107782 A1 | 5/2013 | Anas et al. | |
| 2013/0115998 A1 | 5/2013 | Lamm et al. | |
| 2013/0143617 A1 | 6/2013 | Cea et al. | |
| 2013/0155889 A1 | 6/2013 | Brownworth et al. | |
| 2013/0165120 A1 | 6/2013 | Nylander et al. | |
| 2013/0183971 A1 | 7/2013 | Tamaki et al. | |
| 2013/0195005 A1 | 8/2013 | Al-Shalash | |
| 2013/0222515 A1 | 8/2013 | Abuan et al. | |
| 2013/0225169 A1 | 8/2013 | Farnsworth et al. | |
| 2013/0231115 A1 | 9/2013 | Lin | |
| 2013/0231116 A1 | 9/2013 | Mildh et al. | |
| 2013/0237233 A1 | 9/2013 | Radulescu et al. | |
| 2013/0260745 A1 | 10/2013 | Johansson et al. | |
| 2013/0272268 A1 | 10/2013 | Xu et al. | |
| 2013/0288682 A1 | 10/2013 | Wang et al. | |
| 2013/0294380 A1 | 11/2013 | Gazzard | |
| 2013/0315094 A1 | 11/2013 | Vannithamby et al. | |
| 2013/0316701 A1 | 11/2013 | Knauft | |
| 2014/0057644 A1* | 2/2014 | Chetlur et al. | 455/452.2 |
| 2014/0073303 A1 | 3/2014 | Henderson et al. | |
| 2014/0094178 A1 | 4/2014 | Eskicioglu et al. | |
| 2014/0148174 A1 | 5/2014 | Teyeb et al. | |
| 2014/0226559 A1 | 8/2014 | Jactat et al. | |
| 2015/0036598 A1 | 2/2015 | Kilpatrick, II et al. | |
| 2015/0036663 A1 | 2/2015 | Kilpatrick, II et al. | |
| 2015/0038140 A1 | 2/2015 | Kilpatrick, II et al. | |
| 2015/0038143 A1 | 2/2015 | Kilpatrick, II et al. | |
| 2015/0038180 A1 | 2/2015 | Quick, Jr. et al. | |
| 2015/0066557 A1 | 3/2015 | Lichti | |
| 2015/0163639 A1 | 6/2015 | Kilpatrick, II et al. | |
| 2015/0264534 A1 | 9/2015 | Liu et al. | |
| 2015/0289110 A1 | 10/2015 | Kilpatrick, II et al. | |
| 2015/0304891 A1 | 10/2015 | Dinan | |

FOREIGN PATENT DOCUMENTS

| | | |
|---|---|---|
| EP | 2320694 A1 | 5/2011 |
| EP | 2320702 A1 | 5/2011 |
| EP | 2525605 A1 | 11/2012 |
| EP | 2750457 A1 | 7/2014 |
| GB | 2449228 A | 11/2008 |

(56) References Cited

FOREIGN PATENT DOCUMENTS

| GB | 2472595 A | 2/2011 |
|---|---|---|
| GB | 2472791 A | 2/2011 |
| WO | WO-9955110 A2 | 10/1999 |
| WO | WO-0033478 A1 | 6/2000 |
| WO | WO-2005064969 A1 | 7/2005 |
| WO | WO-2013029396 A1 | 3/2013 |
| WO | WO-2013050067 A1 | 4/2013 |
| WO | WO-2013107042 A1 | 7/2013 |
| WO | WO-2014012568 A1 | 1/2014 |

OTHER PUBLICATIONS

Lyberopoulos et al., "Intelligent Paging Strategies for Third Generation Mobile Telecommunication Systems," IEEE Transactions on Vehicular Technology, Aug. 1995, pp. 543-554, vol. 44, issue 3, ISSN 0018-9545, Institute of Electrical and Electronics Engineers.

ISA/EPO, International Search Report and Written Opinion of the International Searching Authority, Int'l App. No. PCT/US2014/047452, Nov. 25, 2014, European Patent Office, Rijswijk, NL, 12 pgs.

IPEA/US, Second Written Opinion of the International Preliminary Examining Authority, Int'l App. No. PCT/US2014/047452, Jun. 26, 2015, European Patent Office, Munich, DE, 8 pgs.

Becvar et al., "Improvement of Handover Prediction in Mobile WiMAX by Using Two Thresholds," Computer Networks, vol. 55, No. 16, Nov. 2011, pp. 3759-3773, Elsevier B.V.

Jeong et al., "A Smart Handover Decision Algorithm Using Location Prediction for Hierarchical Macro/Femto-Cell Networks," 2011 IEEE Vehicular Technology Conference (VTC Fall), San Francisco, CA, Sep. 5-8, 2011, 5 pgs., ISBN: 978-1-4244-8327-3, Institute of Electrical and Electronics Engineers.

\* cited by examiner

ADAPTING MOBILE DEVICE BEHAVIOR USING PREDICTIVE MOBILITY

CROSS REFERENCES

The present application for patent claims priority to U.S. Provisional Patent Application No. 61/860,789 by Kilpatrick, II et al., entitled "PREDICTIVE MOBILITY IN CELLULAR NETWORKS," filed on Jul. 31, 2013, the entire disclosure of which is incorporated herein by reference for all purposes.

BACKGROUND

The present description relates generally to wireless communication, and more specifically to adapting the behavior of mobile devices based on observed mobility trends. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

In Long Term Evolution (LTE) and other systems, when a mobile device is in a connected state, channel information such as channel quality information (CQI), precoding matrix information (PMI), rank information (RI), and/or transmit power information is measured dynamically for a particular channel. The measured channel information is reported back to the sender and then applied to communications over the respective downlink or uplink channel to adapt channel performance. The reporting back of measured channel information and the application of the measured channel information can introduce unwanted delays for adapting channel parameters to account for changing conditions on both uplink and downlink channels.

SUMMARY

The described features generally relate to one or more improved systems, methods, and/or apparatuses for adjusting one or more channel parameters based on historical channel information associated with mobility patterns of a mobile device. The channel parameters may be adjusted, for example, to better account for or adapt to changing channel conditions, different physical transmission and reception conditions, etc.

According at least one aspect of these principles, a method for wireless communication may include accessing historical channel information associated with mobility patterns of a mobile device and adjusting at least one channel parameter for wireless communications of the mobile device based at least in part on the accessed historical channel information associated with the mobility patterns of the mobile device.

In certain examples, the historical channel information may be used to predict a current channel condition such that adjusting the at least one channel parameter is based at least in part on the predicted current channel condition. In some cases, a variance in a channel condition may be predicted based at least in part on the accessed historical channel information. The at least one channel parameter may be adjusted based at least in part on the predicted current channel condition and the predicted variance in the channel condition. In yet some cases, a level of accuracy of the predicted current channel condition may be determined, and a current channel condition may be measured if the determined level of accuracy satisfies a threshold. Adjusting the at least one channel parameter may be based at least in part on the measured current channel condition.

In certain examples, a current channel condition may be measured, and adjusting the at least one channel parameter may be based at least in part on the measured current channel condition and the accessed historical channel information.

In certain examples, the historical channel information includes at least one of channel quality information (CQI), precoding matrix information (PMI), and rank information (RI).

In certain examples, the historical channel information associated with the mobility patterns of the mobile device may include at least one channel condition associated with at least one of a time value associated with at least one geographic location, a current cell identification (ID), or at least one other cell ID in a known physical route of the mobile device.

In certain examples, the mobility patterns of the mobile device include a physical route previously traveled by the mobile device or another mobile device. In certain examples, it may be recognized that the mobile device is currently traveling along the physical route, and adjusting the at least one channel parameter may be based at least in part on the recognition.

In certain examples, the at least one channel parameter may be a downlink channel parameter comprising at least one of a modulation scheme, a coding scheme, a tone allocation, or a multiple-input multiple-output (MIMO) precoding matrix. Additionally or alternatively, the at least one channel parameter may include an uplink channel parameter having at least one of a constellation size or a coding value.

The at least one channel parameter may be adjusted by the mobile device or a base station serving the mobile device. In the case of a base station adjusting the at least one channel parameter, the at least one channel parameter may be adjusted as the mobile device moves through a coverage area of the base station. The base station may adjust the at least one channel parameter further based on at least one of a current cell identification (ID) or at least one other cell ID in a known physical route of the mobile device.

In certain examples, the base station may adjust at least one channel parameter based on at least one of a current cell identification (ID) or at least one other cell ID in a known path or physical route of the mobile device.

In another aspect, a wireless communications apparatus may include a processor, and a memory in electronic communication with the processor. The memory may embody instructions, the instructions being executable by the processor to access historical channel information associated with mobility patterns of a mobile device, and adjust at least one channel parameter for wireless communications of the mobile device based at least in part on the accessed historical channel information associated with the mobility patterns of the mobile device. In some cases, the apparatus may be a base station or a mobile device. The mobility patterns of the mobile device may include at least one time value associated with at least one geographic location, a current cell identification (ID) of the cell serving the mobile device, and/or at least one other cell ID in a known physical route of the mobile device.

In certain examples, the instructions are further executable by the processor to use the historical channel information to predict a current channel condition and adjust the at least one channel parameter based at least in part on the predicted current channel condition. The instructions may be further executable by the processor to predict a variance in a channel condition based at least in part on the accessed historical channel information and adjust the at least one channel parameter based at least in part on the predicted current channel condition and the predicted variance in the channel condition. In some embodiments, the instructions are further executable by the processor to determine a level of accuracy of the predicted current channel condition, measure a current channel condition if the determined level of accuracy satisfies a threshold, and adjust the at least one channel parameter based at least in part on the measured current channel condition.

In certain examples, the instructions are further executable by the processor to measure a current channel condition and adjust the at least one channel parameter based at least in part on the measured current channel condition and the accessed historical channel information.

In another aspect, a wireless communications apparatus may include means for accessing historical channel information associated with mobility patterns of a mobile device, and means for adjusting at least one channel parameter for wireless communications of the mobile device based at least in part on the accessed historical channel information associated with the mobility patterns of the mobile device.

In certain examples, the wireless communications apparatus may be a base station or a mobile device. In certain examples, the mobility patterns of the mobile device may include at least one time value associated with at least one geographic location, a current cell identification (ID) of the cell serving the mobile device, and/or at least one other cell ID in a known physical route of the mobile device.

In certain examples, the wireless communications apparatus may include means for using the historical channel information to predict a current channel condition. The means for adjusting the at least one channel parameter may use the predicted current channel condition to adjust the at least one channel parameters for wireless communications of the mobile device.

In certain examples, the wireless communications apparatus may include means for predicting a variance in a channel condition based at least in part on the accessed historical channel information. The means for adjusting the at least one channel parameter may use the predicted current channel condition and the predicted variance in the channel condition to adjust the at least one channel parameters for wireless communications of the mobile device.

In certain examples, the wireless communications apparatus may include means for measuring a current channel condition. The means for adjusting the at least one channel parameter may use the measured current channel condition and the accessed historical channel information to adjust the at least one channel parameters for wireless communications of the mobile device.

In another aspect, a computer program product for adjusting at least one channel parameter may include a non-transitory computer-readable storage medium including instructions executable by a processor to access historical channel information associated with mobility patterns of a mobile device, and adjust at least one channel parameter for wireless communications of the mobile device based at least in part on the accessed historical channel information associated with the mobility patterns of the mobile device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
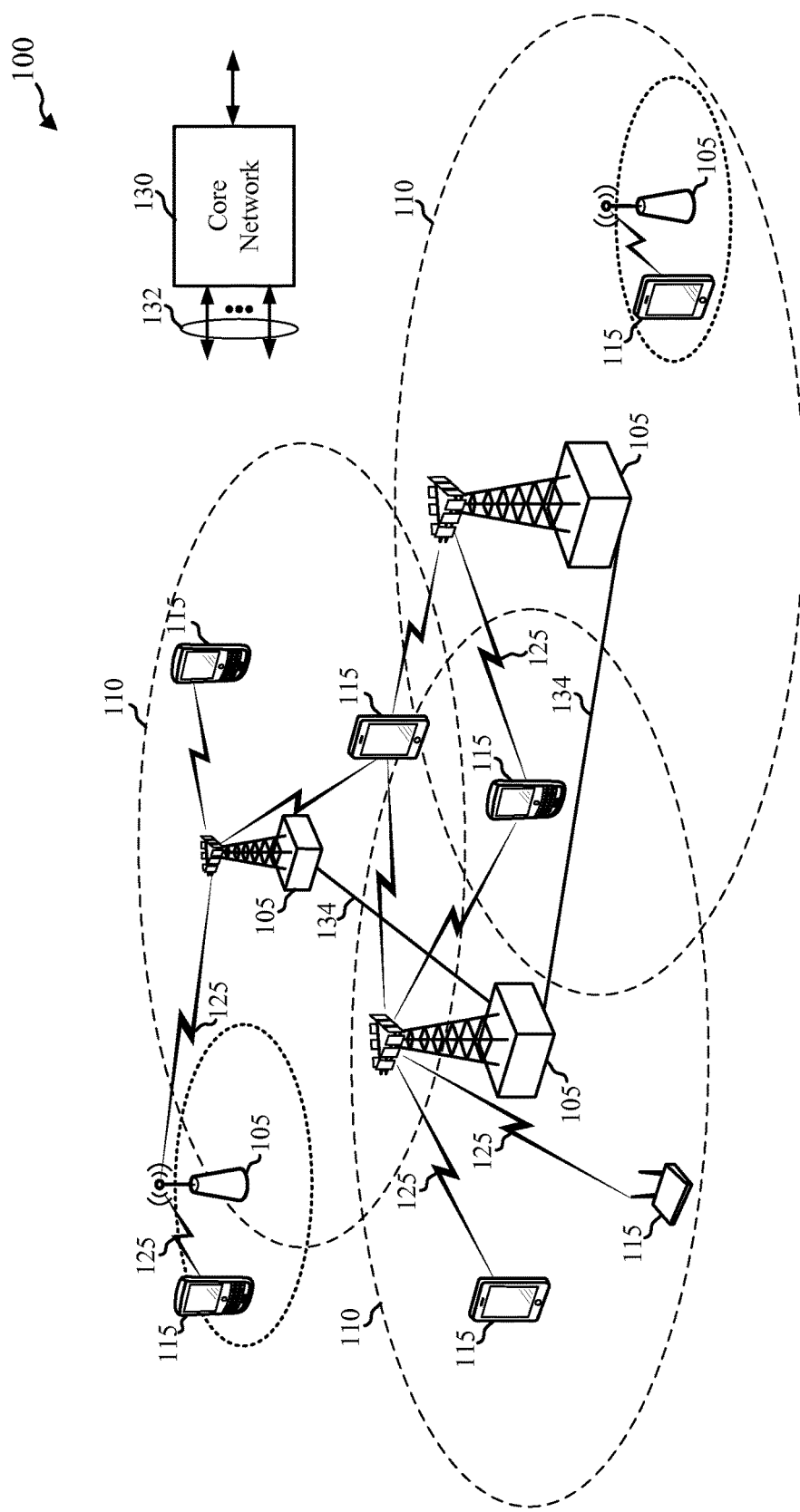
FIG. 1 shows a block diagram of a wireless communications system, according to one aspect of the principles described herein.

The described features generally relate to one or more improved systems, methods, and/or apparatuses for adjusting one or more channel parameters based on historical channel information associated with mobility patterns of a mobile device. The channel parameters may be adjusted, for example, to better account for or adapt to changing channel conditions, different physical transmission and reception conditions, etc.

Adjusting the one or more channel parameters based on the historical information associated with mobility patterns of a mobile device may be carried out in any number of ways. For example, the historical channel information may be used to predict one or more current channel conditions, to allow for better adjustment of one or more channel parameters, for example without requiring actual measuring of the current channel conditions. The historical channel information may be used to predict a variance in one or more channel conditions, where the one or more channel parameters may then be adjusted based on the predicted current channel conditions and the predicted variance. In some cases, the predicted variance may include a measure of channel condition uncertainty, such as including some other moment of the distribution, e.g. skewness ($3^{rd}$ moment) or kurtosis ($4^{th}$ moment) or some fractional moments. In some cases, an accuracy level of the predicted current channel conditions may be determined to better improve the accuracy of the channel parameter adjustment. If the accuracy of the prediction does not meet a certain threshold, such as a confidence level, the current channel conditions may be measured in real time to increase the accuracy of the determination of current channel conditions. In some cases, the historical channel information may be used in conjunction with measured channel conditions to adjust the one or more channel parameters.

In one aspect, a mobile device may access historical channel information associated with mobility patterns of the mobile device or another mobile device. The mobility patterns may include information relative to a particular time and location of a mobile device, a previously traveled physical route by a mobile device, a current cell identification (ID) of the cell serving the mobile device, at least one other cell ID in a known physical route of the mobile device, etc. Based on the historical information associated with the mobility patterns, the mobile device may adjust at least one channel parameter. In some cases, the channel parameter may be a parameter that is measured by the mobile device and reported to the base station, such as a channel quality indicator (CQI), a rank indicator (RI), a precoding matrix indicator (PMI), a received signal strength indicator (RSSI), a reference signal received power (RSRP), or other indication of channel quality. In some examples, the adjusted channel parameter that is reported to the base station may cause the base station to adjust channel parameters that are signaled to the mobile device by the base station, such as a maximum transmit power, an uplink or downlink modulation scheme, a Multiple antenna (MIMO) scheme, a coding scheme, tone allocation, etc. Thus, the mobile device may use the historical channel information to directly adjust channel parameters that are reported to the base station and/or to indirectly adjust channel parameters that the base station signals to the mobile device.

In another aspect, a base station may access historical channel information associated with mobility patterns of a mobile device that it is serving or another mobile device. The mobility patterns may include information relative to a particular time and location of a mobile device, a previously traveled physical route by a mobile device, a current cell identification (ID) of the cell serving the mobile device, at least one other cell ID in a known physical route of the mobile device, etc., as it passes through a coverage area of the base station. Based on the historical channel information associated with the mobility patterns, the base station may adjust at least one channel parameter. In certain examples, the base station may directly adjust a channel parameter received from the mobile device, such as a CQI, RSSI, or RSRP, or other indication of channel quality. Additionally or alternatively, the base station may adjust one or more channel parameters signaled to the mobile device, such as a modulation scheme, a MIMO scheme, a coding scheme, a tone allocation, etc. In certain examples, the base station may collaborate with the mobile device to adjust one or more of the channel parameters based on the historical channel information. For example, the base station may adjust one or more channel parameters for the mobile device in response to receiving an adjusted CQI channel parameter from the mobile device. In certain examples, the base station may adjust channel parameters of the mobile device based on the historical channel information. For example, the base station may adjust a constellation size, modulation scheme, coding, MIMO configuration, or transmit power of the mobile device by signaling an instruction to the mobile device. The mobile device, upon receiving the instruction, may then adjust the indicated channel parameter(s).

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

FIG. 1 is a block diagram conceptually illustrating an example of a wireless communications system 100, in accordance with an aspect of the present disclosure. The wireless communications system 100 includes base stations (or cells) 105, mobile devices 115, and a core network 130. The base stations 105 may communicate with the mobile devices 115 under the control of a base station controller (not shown), which may be part of the core network 130 or the base stations 105 in various examples. Base stations 105 may communicate control information and/or user data with the core network 130 through backhaul links 132. In certain examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 sites may provide communication coverage for a respective coverage area 110. In some examples, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In certain examples, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each base station 105 may provide communication coverage for a macro cell, a pico cell, a femto cell, and/or other types of cell. A macro cell generally covers a relatively large coverage area (e.g., several kilometers in radius) and may allow unrestricted access by mobile devices 115 with service subscriptions with the network provider. A pico cell would generally cover a relatively smaller coverage area (e.g., buildings) and may allow unrestricted access by mobile devices 115 with service subscriptions with the network provider. A femto cell would also generally cover a relatively small coverage area (e.g., a home) and, in addition to unrestricted access, may also provide restricted access by mobile devices 115 having an association with the femto cell (e.g., mobile devices 115 in a closed subscriber group (CSG), mobile devices 115 for users in the home, and the like). A base station 105 for a macro cell may be referred to as a macro eNodeB. A base station 105 for a pico cell may be referred to as a pico eNodeB. And, a base station 105 for a femto cell may be referred to as a femto eNodeB or a home eNodeB. A base station 105 may support one or multiple (e.g., two, three, four, and the like) cells.

The core network 130 may communicate with the base stations 105 via a backhaul link 132 (e.g., an S1 interface, etc.). The base stations 105 may also communicate with one another, e.g., directly or indirectly via backhaul links 134 (e.g., an X2 interface, etc.) and/or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The mobile devices 115 may be dispersed throughout the wireless communications system 100, and each mobile device 115 may be stationary or mobile. A mobile device 115 may also be referred to by those skilled in the art as a UE, mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like.

The communication links 125 shown in the wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Mobile device 115 users typically have predictable behavior, often doing the same things or going to the same places at about the same time each day. One example is the travel pattern and schedule of a mobile device 115 user, or of multiple mobile device 115 users, going to and from work and/or traveling on the same roads, highways, etc. A user may typically leave home at a certain time, travel certain roads to get to work, stay at work until it is time to go back home using the same roads as before, and then repeat more or less the same routine the next day. Because the movements of a mobile device 115 user in such a scenario can be foreseeable, it may be possible to predict channel conditions, for both the uplink and downlink, based on historical channel information associated with the movement or mobility patterns of the same or another mobile device 115. The historical data may be of channel conditions associated with a certain time of day, a certain geographic location, a known route, or any combination thereof. The historical channel information may be of CQI, RI, PMI, transmit power, RSSI, RSRP, a modulation scheme, a coding scheme, tone allocation, or other similar parameters for a particular channel. Moreover, the use of historical channel information may also apply to other devices such as laptops, tablets, pads, machine-to-machine (M2M) devices, and the like.

Mobility patterns of a mobile device, and particularly historical channel information associate with the mobility patterns, may be used to alleviate network signaling demands, to reduce mobile device 115 measurements to extend battery life, to adapt one or more channel parameters to better match changing channel conditions, and/or to allocate networking resources more effectively, for example.

In particular, a mobile device 115 and/or a base station 105 may use historical channel information associated with a time, place, route, etc. of a mobile device 115 to better adjust one or more channel parameters for communications between the mobile device 115 and the base station 105.

Figure 2:
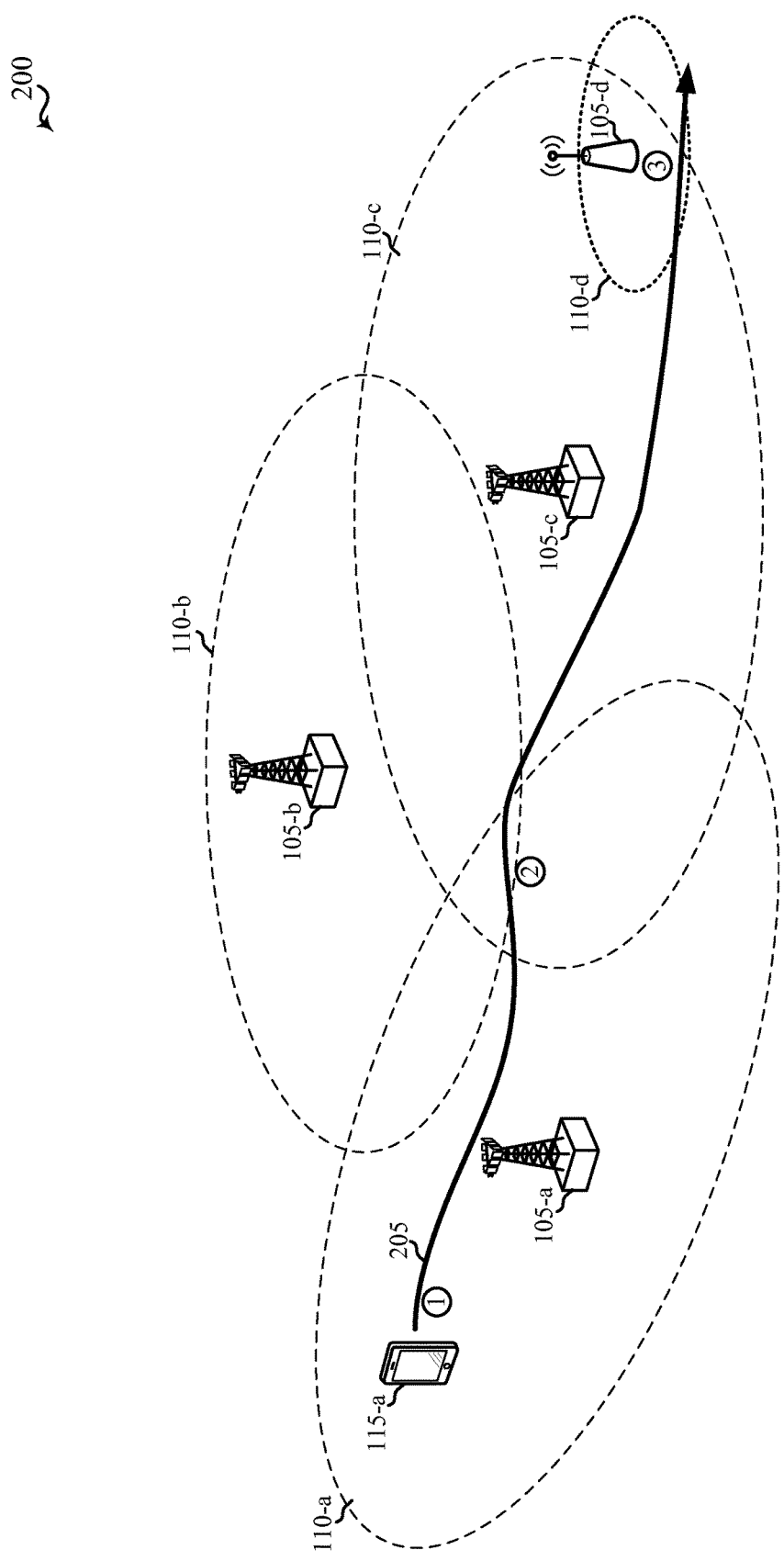
FIG. 2 shows a diagram of an example of device mobility in a wireless communications system, according to one aspect of the principles described herein.

FIG. 2 shows a diagram of an example of device mobility in a wireless communications system 200, according to one aspect of the principles described herein. In the wireless communications system 200 of FIG. 2, a mobile device 115-*a* travels along a route 205 through the coverage areas 110-*a*, 110-*b*, 110-*c*, 110-*d* of a first base station 105-*a*, a second base station 105-*b*, a third base station 105-*c*, and a fourth base station 105-*d*. The mobile device 115-*a* may be an example of one or more of the mobile devices 115 of FIG. 1. Similarly, the base stations 105 of FIG. 2 may be examples of one or more of the base stations 105 of FIG. 1.

Each base station 105 may represent an actual or potential serving cell for the mobile device 115-*a*. In the present example, the mobile device 115-*a* may begin at position 1 with the first base station 105-*a* as the serving cell. At position 1, the mobile device 115-*a* and the first base station 105-*a* may exchange channel information, such as CQI, RI, PMI, transmit power, and/or other channel information to adjust one or more channel parameters for uplink and/or downlink communications.

In one example, the mobile device 115-*a* may access historical channel information associated with mobility patterns of the mobile device 115-*a* to determine if there is any available information related to the time, place and/or route that the mobile device is currently traveling on. The mobile device 115-*a* may use known techniques for determining its current location such as GPS, network signaling, pathloss, Doppler, etc., and may determine the current time corresponding to the current location. The mobile device 115-*a* may then compare its current location, e.g. position 1, and time with values stored with the historical channel information. The mobile device 115-*a* may access previously stored data on the mobile device 115-*a* itself, and/or access the information via the wireless communications system 200, such as through communicating with any of the base stations 105.

The mobile device 115-*a* may then use historical channel information associated with mobility patterns of the mobile device 115-*a* or another mobile device 115 to adjust one or more channel parameters for communications with the first base station 105-*a*. For example, as will be discussed in further detail, the channel parameter may be a channel quality indicator (CQI) and the mobile device 115-*a* may increase or decrease the CQI reported to a base station 105 at a given time and place on the recognized route based on one or more historical CQIs associated with an analogous time and place on the recognized route.

In another example, the first base station 105-*a* may access historical channel information associated with mobility patterns of the mobile device 115-*a* to determine if there is any available information related to the time, place and/or route that the mobile device is currently traveling on. The first base station 105-*a* may use any known techniques for determining the current location of the mobile device 115-*a* such as GPS, network signaling, pathloss, Doppler, etc., and may determine the current time at which the mobile device 115-*a* arrives at its current location. The first base station 105-*a* may then compare the current location of the mobile device 115-*a*, e.g. position 1, and time with mobility pattern information stored with the historical channel information. The base station 105-*a* may access previously stored data by the network, information stored by or associated with the individual base station 105-*a*, or information stored on the mobile device 115-*a*.

The first base station 105-*a* may then use historical channel information associated with mobility patterns of the mobile device 115-*a* or another mobile device 115 to adjust one or more channel parameters for communications with the mobile device 115-*a*.

The operation of using historical channel information associated with mobility patterns of the mobile device 115-*a* to adjust one or more channel parameters, as described above, may also be implemented when the mobile device 115-*a* is located at position 2, position 3, or anywhere in-between, for example along the route 205 with any of the base stations 105.

At varying times and/or periodically, the mobile device 115-*a* may store its own mobility patterns and/or channel information associated with its own particular mobility patterns. In some implementations, for example when the mobile device 115-*a* is located at position 2, the mobile device 115-*a* may predict that it is traveling on route 205 by accessing the previously stored mobility data. In other implementations, another mobile device 115 may have stored mobility patterns and/or channel information associated with its own particular mobility patterns, which are accessible to mobile device 115-*a* via the wireless communications system 200. In either case, the mobile device 115-*a* or the second base station 105-*b* may access the historical channel information associated with the particular mobility pattern, e.g. route 205, to adjust one or more channel parameters for communicating with the other device, respectively.

In some cases, the mobile device 115-*a* or second base station 105-*b* may predict current channel conditions based on the historical channel information, such as using historical channel information associated with route 205. The mobile device 115-*a* or the second base station 105-*b* may additionally determine a level of accuracy of the predicted current channel condition. This accuracy determination may be based on a correlation between multiple locations recorded on the current travel route of the mobile device 115-*a* and multiple locations previously stored and associated with the historical channel information. The accuracy determination may also be based on a correlation between a current time that the mobile device 115-*a* is located at position 2 and a stored time value associated with the historical channel information. In other examples, other information and/or techniques may be used to determine an accuracy of a predicted current channel condition.

According to one approach, a predictive algorithm application may reside on the mobile device 115-*a*. Mobile device profile information (i.e., based on collected historical information associated with mobility patterns of the mobile device) and channel information may be stored by the mobile device 115-*a* for use by the predictive algorithm application. Over a certain learning period (e.g., twenty days), enough information (e.g., location, time, speed, cell measurements, etc.) may be collected by the mobile device 115-*a* to predict with a high degree of confidence where the mobile device 115-*a* will be on a certain day and time. Alternatively, a network entity (e.g., measurement server) may collect and store the profile information of the mobile device 115-*a*, and the predictive algorithm application of the mobile device 115-*a* may communicate with the network entity to access the mobile device profile information.

For example, when the signal strength drops in coverage area 110-*a*, the predictive algorithm application may identify with a high degree of confidence (e.g., >90%) that the mobile device 115-*a* is moving along a known route 205 and that the next coverage area along the route 205 is coverage area 110-*b*. This may similarly be determined when the mobile device 115-*a* approaches coverage area 110-*c* and 110-*d*. In this scenario, if the confident level meets a predetermined threshold, the mobile device 115-*a* may report and/or base any channel parameter adjustments on the predicted or historical channel information, without measuring the current channel conditions. This may decrease traffic between the mobile device and any of the base stations 105, thus reducing power consumption, interference, etc. This may also allow the mobile device 115-*a* to conserve battery power as it may reduce the number of times it measures channel information in a given time period.

In some cases, the mobile device 115-*a* may deviate from the route 205. The mobile device may then switch to searching for other similar mobility pattern information upon which to based predictions of channel conditions. If no similar mobility patterns are found, the mobile device may reset to measuring channel conditions in the standard preconfigured manner, as is well known in the art and configured in the network. If at a later time, based on a comparison of the current movement of the mobile device 115-*a* and the stored mobility patterns, the mobile device 115-*a* returns to traveling on the route 205, the mobile device 115-*a* may again utilize the above described techniques to adjust one or more channel parameters based on historical channel information associated with route 205.

In certain examples, where the mobile device 115-*a* is measuring and storing channel information relative to mobility information, the mobile device 115-*a* may have the ability to create a mean and standard deviation for the channel conditions for each location, time, route, etc. The mean and standard deviation values for the channel conditions may allow the mobile device 115-*a* to adjust for temporary alterations to channel conditions. For example, the route 205 may include a train crossing that occasionally delays travel along the route 205. The mobile device 115-*a* may store or have access to a period of historical route information/channel information indicating that a delay in travel occurs relatively frequently at or around a certain time of day. The train may pass between the mobile device 115-*a* and the serving base station 105 during this delay, causing channel conditions to degrade significantly, even though the mobile device 115-*a* remains on the predicted route 205.

By tracking historical mean and standard deviation values for the serving cell's channel conditions, the predictive algorithm application residing on the network and/or the mobile device 115-*a* may identify that the degradation in channel conditions is a regular and expected occurrence, thereby allowing the mobile device 115-*a* to continue to rely on historical channel information for basing adjustments to one or more channel parameters.

According to a second approach, the predictive behavior of the mobile device 115-*a* may be stored in a network entity (e.g., measurement server) and may be accessed by a predictive algorithm in the network to optimize channel condition measurements. One way in which behavior information may be collected is by tracking the electronic serial number (ESN) or the international subscriber identity (IMSI) through base stations 105 (e.g., NB/eNBs), mobility management entities (MMEs), or other network devices. Over the learning period profile information may be collected by the network based on the observed behavior of the mobile device 115-*a*. The profile information may be used to predict with a high degree of confidence where a particular mobile device 115-*a* will be on a certain day and time.

The techniques described above when the mobile device 115-*a* is located at position 2 may also be applied when the mobile device is located anywhere along route 205, including at position 3 with the third base station 105-*c*, and at position 4 with the fourth base station 105-*d*. Another input to the accuracy determination described above may be the number of location points and/or time values that correlate between the current mobility information of the mobile device 115-*a* and the previously stored data associated with the historical channel information.

In one example, the base station 105-*b* may adjust at least one channel parameter further based on at least one of a current cell or coverage area identification (ID) (e.g., 110-*a*, 110-*b*, 110-*c*, 110-*d*, etc.) or at least one other cell ID in the known or predicted route 205 of the mobile device 115-*a*.

The above techniques for adjusting one or more channel parameters based on accessed historical channel information associated with mobility patterns of a mobile device 115-*a* may be implemented in conjunction with, or independently of, handover operations among base stations 105-*a*, 105-*b*, 105-*c*, and/or 105-*d*.

Figure 3A:
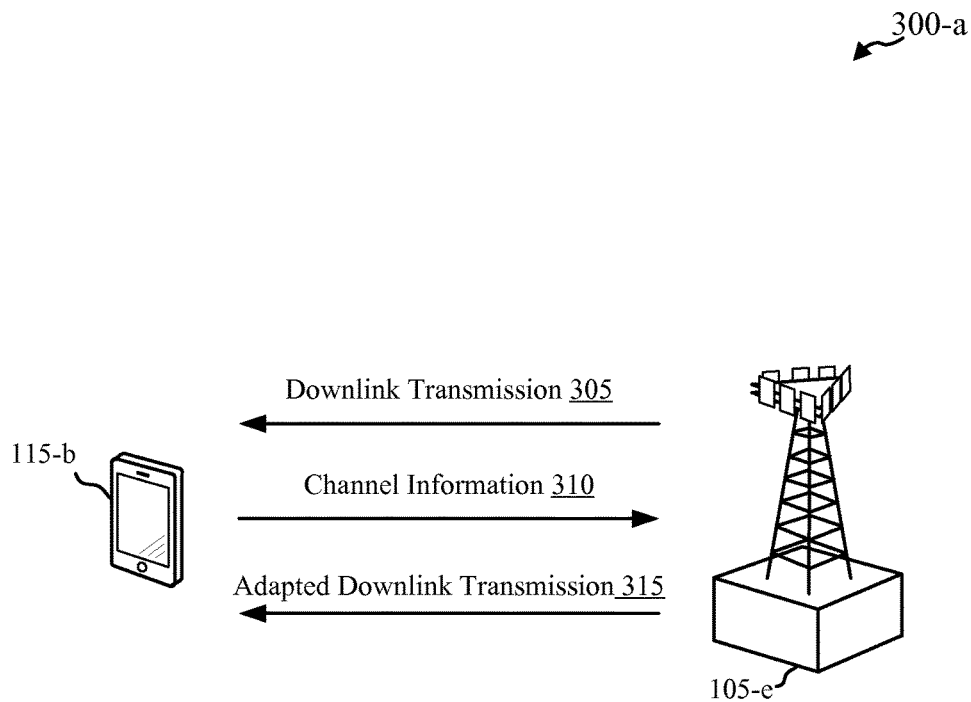
FIG. 3A shows a diagram of an example of adjusting one or more channel parameters for downlink transmissions, according to one aspect of the principles described herein.
Figure 3B:
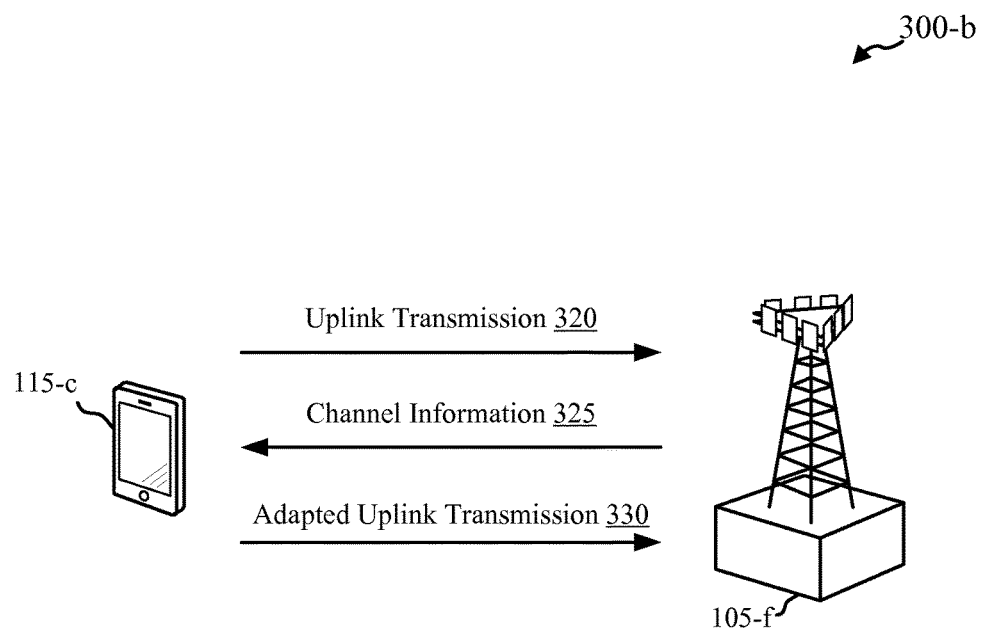
FIG. 3B shows a diagram of an example of adjusting one or more channel parameters for uplink transmissions, according to one aspect of the principles described herein.

In reference to FIGS. 3A and 3B, wireless communications systems 300-*a* and 300-*b* and related processes for adjusting channel parameters are shown. Each of the wireless communications systems 300-*a*, 300-*b* may include a base station 105-*e*, 105-f in communication with a mobile device 115-*b*, 115-*c*. The wireless communications systems 300-*a*, 300-*b* may each be an example of or part of one or more of the wireless communications systems 100 and/or 200 described in reference to FIGS. 1 and 2 above. Similarly, the base stations 105-*e*, 105-f and mobile devices 115-*b*, 115-*c* of FIGS. 3A and 3B may be examples of respective ones of the base stations 105 and mobile devices 115 described in reference to FIGS. 1 and 2 above. The mobile device 115-*b*, 115-*c* and the base station 105-*e*, 105-*f* may be configured for adjusting one or more channel parameters based on historical channel information associated with mobility patterns of a mobile device 115, in accordance with the techniques described above.

With specific reference to the wireless communications system 300-*a* of FIG. 3A, a communication scheme is shown for adjusting one or more channel parameters for downlink transmissions from the base station 105-*e* to the mobile device 115-*b*. The base station 105-*e* may transmit one or messages to the mobile device 115-*b* via a downlink transmission 305. According to the techniques described herein, the mobile device 115-*b* may then determine or set one or more channel parameters to report back to the base station 105-*e*. This may include accessing historical channel information associated with mobility patterns of the mobile device 115-*b* or another mobile device 115 and predicting a current value of the one or more channel parameters based on the historical channel information. In additional or alternative examples, the mobile device 115-*b* may adjust one or more channel parameters based on one or more previously measured channel parameters and based on the historical channel information. The one or more channel parameters may include CQI, RSSI, RSRP, or other indictors of channel quality. The mobile device 115-*b* may then transmit the channel information 310 to the base station 105-*e*.

Upon receiving the channel information 310, the base station 105-*e* may then adjust one or more downlink channel parameters, such as a, modulation scheme, a MIMO scheme, a coding scheme, a tone allocation, etc. The base station 105-*e* may then transmit one or messages to the mobile device 115-*b* according to or implementing the adapted downlink channel parameters 315.

With specific reference now to the wireless communications system 300-*b* of FIG. 3B, a communication scheme is shown for adjusting one or more channel parameters for uplink transmissions from the mobile device 115-*c* to the base station 105-*f*. The mobile device 115-*c* may transmit one or messages to the base station 105-*f* via uplink transmission 320. According to the techniques described herein, the base station 105-*f* may then adjust one or more channel parameters, or other channel information directly for the uplink based on historical data. Additionally or alternatively, the base station 105-*f* may adjust one or more channel parameters transmitted back to the mobile device 115-*c* enabling the mobile device 115-*c* to adjust the one or more channel parameters.

Adjusting the one or more channel parameters may include adjusting a previously measured channel parameter based on historical channel information. Adjusting the one or more channel parameters may alternatively include predicting and setting a current channel parameter based on the historical information. The adjusting or setting of one or more channel parameters may include accessing historical channel information associated with mobility patterns of the mobile device 115-*c* or another mobile device 115 and adjusting the one or more channel parameters based on the accessed historical information. The one or more channel parameters may include parameters reported by the mobile device 115-*c*, such as CQI, RSSI, RSRP, RI, PMI, etc., and/or channel parameters set by the base station 105-*f*, such as maximum transmit power, modulation level, tone allocation, MIMO precoding matrix information, constellation size, other coding parameters, etc., that can be utilized to adapt the uplink channel parameters. The base station 105-*f* may then transmit channel information 325 to the mobile device 115-*c*, which may include new channel parameters for the mobile device 115-*c* to utilize during communications with the base station 105-*f* or another network entity.

Upon receiving the channel information 310, the mobile device 115-*c* may then adapt one or more uplink or downlink channel parameters. The mobile device 115-*c* may then transmit one or messages to the base station 105-*f* according to or implementing the adjusted uplink channel parameters 330.

Figure 4:
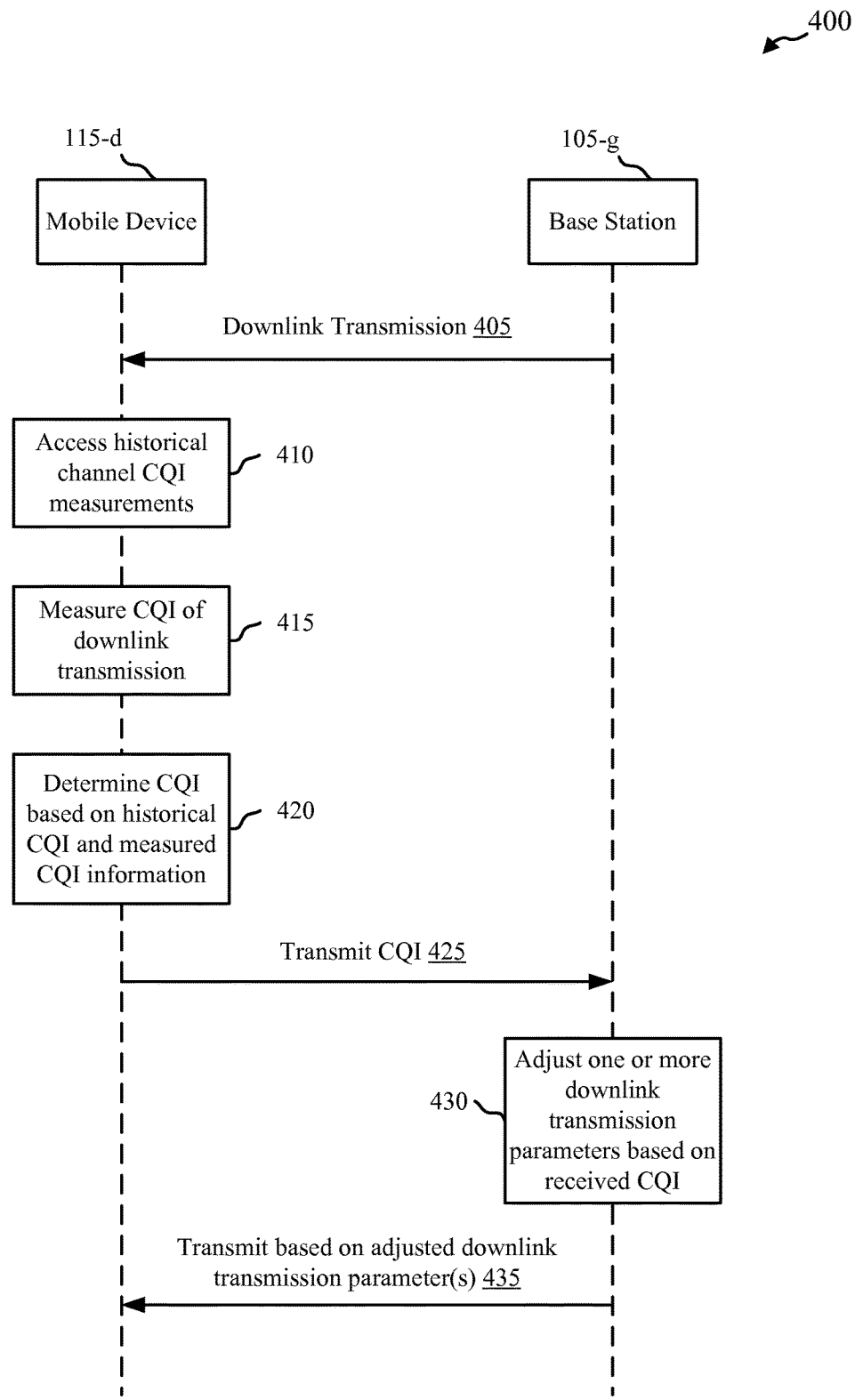
FIG. 4 shows example communications between a mobile device and a base station for adjusting one or more channel parameters for downlink transmissions based on historical channel parameter measurements, according to one aspect of the principles described herein.

In reference to FIG. 4, a process for adjusting one or more channel parameters based on historical channel information associated with mobility patterns of a mobile device 115-*d* is shown. The process is shown in the context of a wireless communications system 400 including a mobile device 115-*d* and a base station. The mobile device 115-*d* and/or the base station 105-*g* may be an example of or part of one or more of the wireless communications systems 100, 200, and/or 300 described in reference to FIGS. 1, 2, 3A, and 3B above. In particular, the process 400 of FIG. 4 may be an example of the process described with reference to FIG. 3A. Similarly, the mobile device 115-*d* and the base station 105-*g* may each be an example, respectively, of one or more of the mobile devices 115 or base stations 105 described in reference to FIGS. 1, 2, 3A, and 3B above. The mobile device 115-*d* and the base station 105-*g* may be configured for adjusting one or more channel parameters based on historical channel information associated with mobility patterns of a mobile device 115, in accordance with the techniques described above.

The process 400 may begin with the base station 105-*g* transmitting one or more messages to the mobile device 115-*d* via downlink transmission 405. In response to receiving the downlink transmission 405, such as when the mobile device 115-*d* is configured to aperiodically update channel information, the mobile device 115-*d* may access historical CQI measurements associated with a mobility pattern of the mobile device 115-*d* or another mobile device 115 at block 410. Alternatively, the mobile device 115-*d* may be configured to periodically update channel information. In this scenario, the mobile device 115-*d* may access historical CQI at block 410 after the next periodic time occurs subsequent to receiving downlink transmission 405, to update channel information. In accessing the historical channel information or measurements, the mobile device 115-*d* may determine that there exists historical CQI information for a current position, time, and/or route of the mobile device 115-*d*, such as via the techniques described in reference to FIG. 2. At block 415, the mobile device 115-*d* may also measure the CQI of the downlink transmission received from the base station 105-*g*. Based on both the measured CQI and the historical CQI associated with mobility patterns of a mobile device 115, the mobile device 115-*d* may determine a CQI at block 420 to report back to the base station 105-*g*. The mobile device 115-*d* may transmit the determined CQI to the base station 105-*g* at block 425.

In some cases, such as when there is historical CQI information associated with and correlating to a current time of day, location, and/or route of mobile device 115-*d*, the mobile device 115-*d* may use this information to predict how the measured CQI will change in the time it takes to report the CQI back to the base station 105-*g* and have the measured CQI affect downlink transmissions from the base station 105-*g*.

The determination in block 420 of a CQI to report back to the base station 105-*g* may be based on both the measured and predicted CQI information. In this situation, communication performance, such as throughput of downlink transmissions from the base station 105-g, may be improved. In some cases, determining the CQI transmitted back to the base station 105-g may include comparing accessed historical CQI information with the measured CQI information to confirm the accuracy of the measured CQI information.

In some cases, the mobile device 115-d may discover that there is no relevant CQI information associated with the current position, time, and/or trajectory of the mobile device 115-d. In this case, the mobile device 115-d may report back only the measured CQI information to the base station 105-g. The CQI transmitted back to the base station 105-g at block 425 may thus include the measured CQI information without adjustments based on historical mobility patterns. In additional or alternative examples, the mobile device 115-d may weight the influence of historical data on the adjustment of the CQI in proportion to the relevancy of the historical data to a current position, time, and/or trajectory of the mobile device 115-d. In additional or alternative examples, the mobile device 115-d may weight the influence of historical data on the adjustment of the CQI in inverse proportion to the age of the historical data.

Upon receiving the transmitted CQI, the base station 105-g may then adjust one or more downlink channel parameters based on the received CQI information at block 430. This may include adjusting a modulation scheme, a MIMO scheme, a coding scheme, a tone allocation, etc., for the next downlink transmission to the mobile device 115-d. At block 435, the base station 105-g may then transmit one or messages to the mobile device 115-d based on the adjusted downlink channel parameters. The adjustment of channel parameters based on the historical channel information may lead to an increase in channel performance, especially when channel conditions are rapidly changing (e.g., based on physical surroundings, differences in or obstructions in the communication path, etc.).

It should be appreciated that CQI is used in the example described in reference to FIG. 4 only as an example. Any other channel information, such as RI, PMI, RSSI, RSRP, or other types of channel information or metric may be used in place of or in addition to CQI information. Furthermore, the techniques described above are applicable to both wide band and narrow band CQI.

Figure 5:
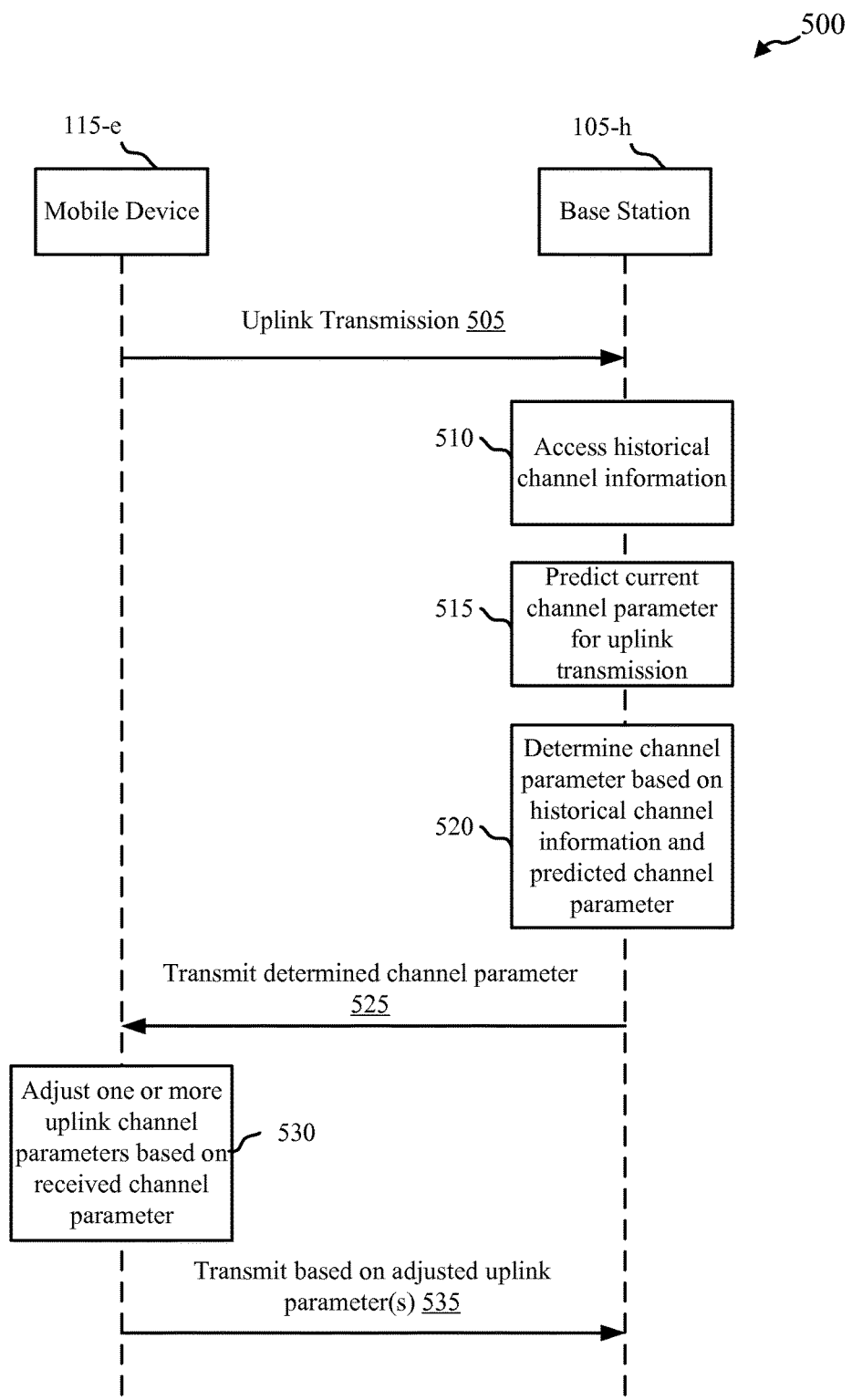
FIG. 5 shows example communications between a mobile device and a base station for adjusting one or more channel parameters for uplink transmissions based on historical channel parameter measurements, according to one aspect of the principles described herein.

In reference to FIG. 5, a process 500 for adjusting one or more channel parameters based on historical channel information associated with mobility patterns of a mobile device 115-e is shown. The process is shown in the context of a wireless communications system including a mobile device 115-e and a base station 105-h. The mobile device 115-e and/or the base station 105-h may be an example of or part of one or more of the wireless communications systems 100, 200, and/or 300 described in reference to FIGS. 1, 2, 3A. In particular, the process 500 of FIG. 5 may be an example of the process described above with reference to FIG. 3B. The process 500 of FIG. 5 may be implemented in conjunction with process 400 of FIG. 4. Similarly, the mobile device 115-e and the base station 105-h may each be an example, respectively, of one or more of the mobile devices 115 or base stations 105 described in reference to FIGS. 1, 2, 3A, 3B, and 4 above.

The mobile device 115-e and the base station 105-h may be configured for adjusting one or more channel parameters based on historical channel information associated with mobility patterns of a mobile device 115, in accordance with the techniques described above. The process 500 may begin with the mobile device 115-e sending one or more messages to base station 105-h via an uplink transmission 505. The base station 105-h may, in response to the uplink transmission 505 or on a periodic schedule, access historical channel information at block 510.

The historical channel information may be associated with mobility patterns of a mobile device 115, and may provide a basis by which the base station 105-h adjusts one or more channel parameters. For example, the base station 105-h may determine that the mobile device 115-e is at a geographic location at a certain time for which the mobile device 115-e or another mobile device 115 has previously provided channel measurements or other channel information. The base station 105-h may also determine that the mobile device 115-e is traveling on a route on which either mobile device 115-e or another mobile device 115 has previously traveled such that stored channel information for various locations along the route is available.

Based on this historical channel information, which may be associated with a geographic location, time, and/or a route, the base station 105-h may predict at block 515 one or more current channel parameters for uplink transmissions from the mobile device 115-e. In addition or alternatively, the base station 105-h may also predict one or more current channel conditions for downlink transmission to the mobile device 115-e (not shown). The predicted channel condition may be in the form of a predicted channel parameter measured by the mobile device 115-e, such as a CQI, RI, PMI, RSSI, or RSRP measurement, and/or a predicted channel parameter set by the base station 105-h, such as a maximum transmit power or other channel parameter.

Based on the one or more predicted channel conditions, and/or on the historical channel information associated with mobility patterns of a mobile device 115, at block 520 the base station 105-h may determine or adjust one or more channel parameters. The base station 105-h may determine and set a current channel parameter based on a predicted current channel parameter. Additionally or alternatively, the base station 105-h may adjust a previously measured channel parameter based on the historical information. The one or more channel parameters determined or adjusted by the base station 105-h may include a channel parameter set by the base station 105-h, such as a maximum transmit power, a modulation scheme, a MIMO scheme, a coding scheme, a tone allocation, etc. Determining the one or more channel parameters may include determining one or more channel parameters for a later time of uplink transmission from the mobile device 115-e. At block 525, the base station 105-h may then transmit the determined one or more channel parameters to the mobile device 115-e. In additional or alternative examples, the base station 105-h may adjust a current or recent channel parameter reported by the mobile device 115-e (e.g., a CQI, RI, PMI, RSSI, or RSRP measurement) prior to using the reported channel parameter to set a different channel parameter for the mobile device (e.g., the maximum transmit power, modulation scheme, MIMO scheme, coding scheme, tone allocation, etc.).

In some examples, the mobile device 115-e may then adjust one or more uplink channel parameters based on the determined channel parameter(s) received from the base station 105-h. For example, the mobile device 115-e may adjust one or more of a maximum transmit power, a modulation scheme, coding scheme, tone allocation, etc., according to instructions received from the base station 105-h. The mobile device 115-e may then transmit one or more messages on the uplink at block 535 to the base station 105-h based on the adjusted channel parameter(s).

Figure 6:
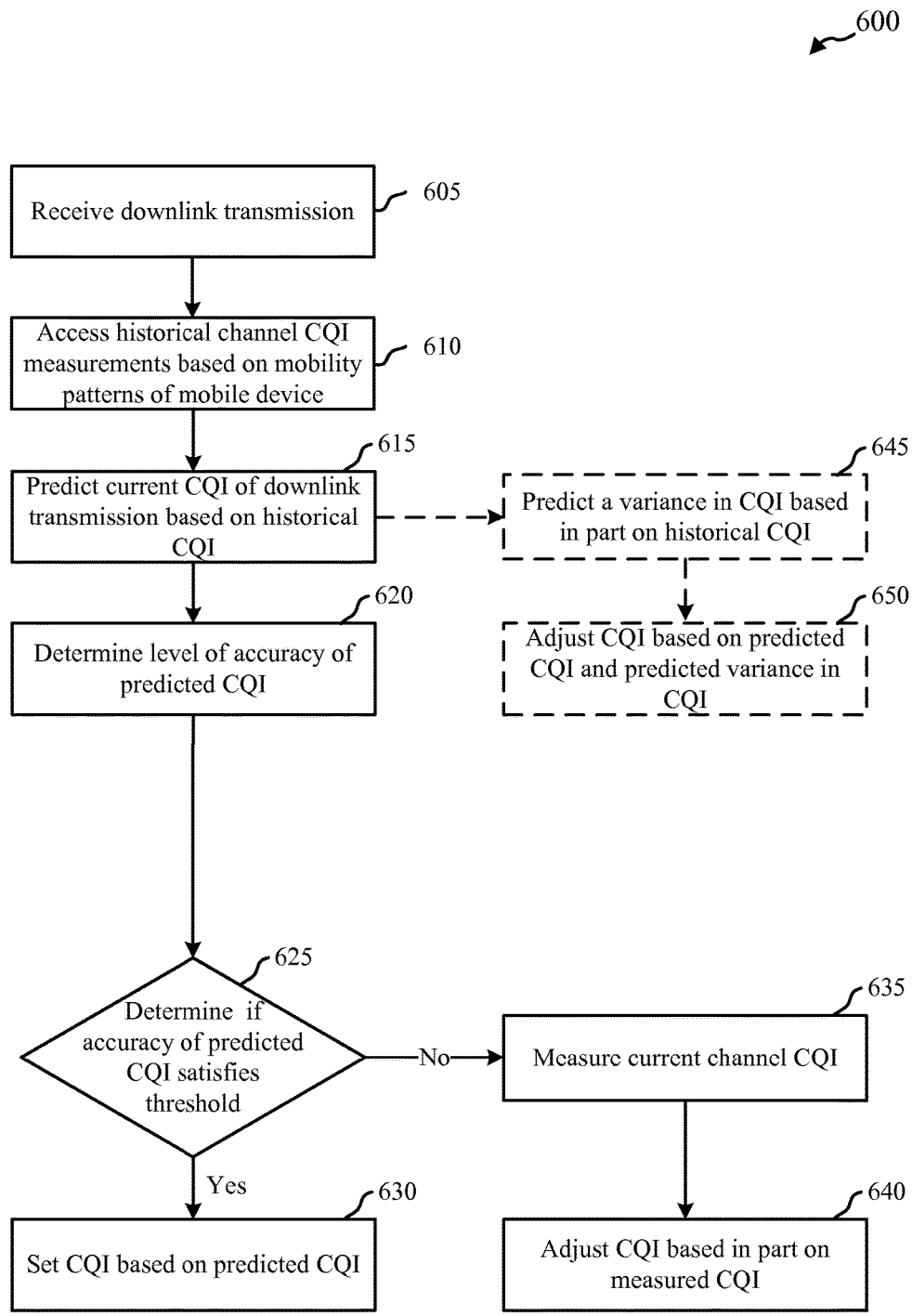
FIG. 6 shows a flow block diagram of an example of adjusting one or more channel parameters based on historical channel information, according to one aspect of the principles described herein.

In reference to FIG. 6, a process 600 for adjusting one or more channel parameters based on historical channel information associated with mobility patterns of a mobile device is shown. The process 600 of FIG. 6 may be operable within one or more of the wireless communications systems 100, 200, 300, 400, and/or 500 described in reference to the previous Figures. The process 600 may be implemented by a mobile device 115 and/or a base station 105 as described in reference to previous Figures. A mobile device 115 may implement the process 600 to adjust one or more channel parameters based on historical channel information associated with mobility patterns of a mobile device 115, in accordance with the techniques described above.

A mobile device 115 may receive a downlink transmission at block 605 from a base station 105. Next, the mobile device 115 may access historical CQI information or measurements associated with the current mobility pattern of mobile device 115 at block 610. Based on the historical CQI, the mobile device 115 may predict the current CQI of downlink transmissions from a serving base station 105 at block 615.

In one aspect, the mobile device 115 may determine a level of accuracy of the predicted CQI at block 620. The accuracy determination may be carried out via the techniques described above in reference to FIG. 2, such as by comparing one or more geographic locations and/or times of previously recorded CQI information with the current mobility pattern of the mobile device 115. The mobile device 115 may then determine if the accuracy of the predicted CQI satisfies a threshold at block 625. The threshold may include a confidence interval, for example 60%, 70%, 80%, 90%, etc., or another percentage indicating a suitable level for channel adjustment. The threshold may be statically determined and set by the mobile device 115 in real time or previously set, by the serving base station 105, another base station 105, the network, etc. The threshold may also be preconfigured by the network, contingent on channel conditions a certain time prior to the determination, modified by known path conditions, etc.

If it is determined that the accuracy fails to satisfy the threshold (block 625, No), e.g., the accuracy falls below the confidence interval, the mobile device 115 may measure the current channel CQI at block 635. The mobile device 115 may then adjust the CQI that the mobile device 115 reports to the serving base station 105 based at least in part on the measured CQI at block 640.

If it is determined the accuracy satisfies the threshold (block 625, Yes), e.g., the accuracy meets or exceeds the confidence interval, the mobile device 115 may set the CQI that the mobile device 115 reports to the serving base station 105 based on the predicted CQI at block 630, in some cases without performing a new CQI measurement.

Alternatively or additionally, after the mobile device 115 predicts a current CQI at block 615, the mobile device 115 may predict a variance in CQI based on the historical CQI information associated with the current mobility pattern of mobile device 115 at block 645. In some cases, the predicted variance may include a measure of channel condition ($3^{rd}$ uncertainty, such as including some other moment of the distribution, e.g. skewness moment) or kurtosis ($4^{th}$ moment) or some fractional moments. The mobile device 115 may adjust the CQI that it reports to the serving base station based on the predicted CQI and the predicted variance in CQI at block 650.

In some cases, the operations at blocks 645 and 650 may be performed after the mobile device 115 determines that the accuracy of the predicted CQI meets the threshold at block 625. In the above description, CQI is given only as an example. Other channel parameters and/or channel information may be used in place of CQI in process 600, such as RI, PMI, RSSI, RSRP, etc.

Figure 7A:
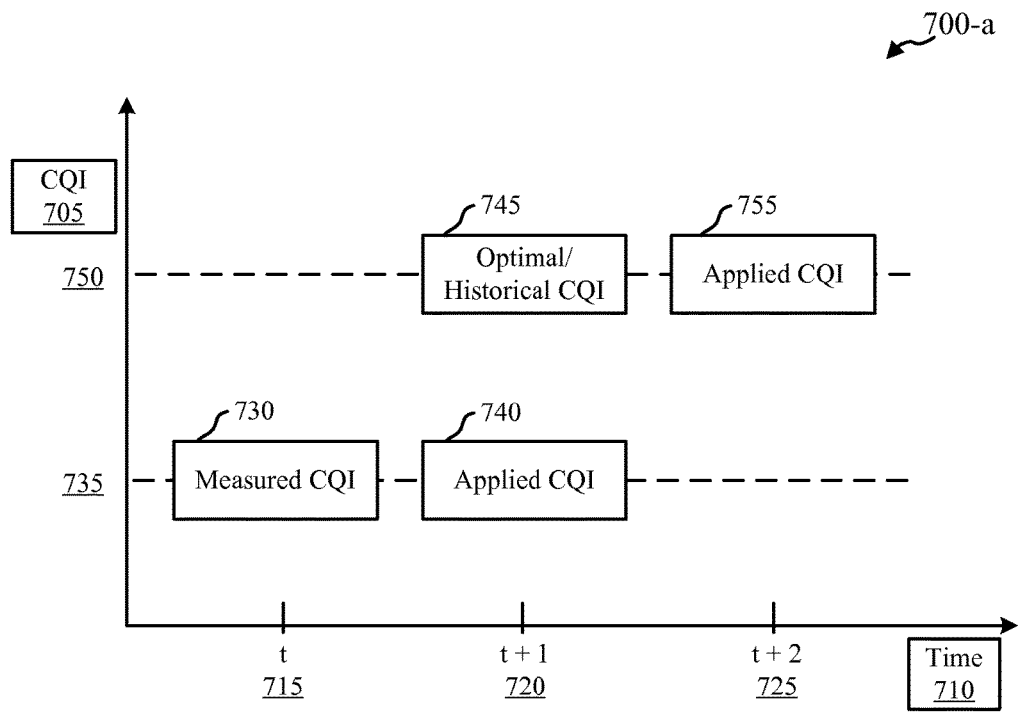
FIG. 7A shows a diagram of an example of measured versus optimal/historical CQI relative to time, according to one aspect of the principles described herein.
Figure 7B:
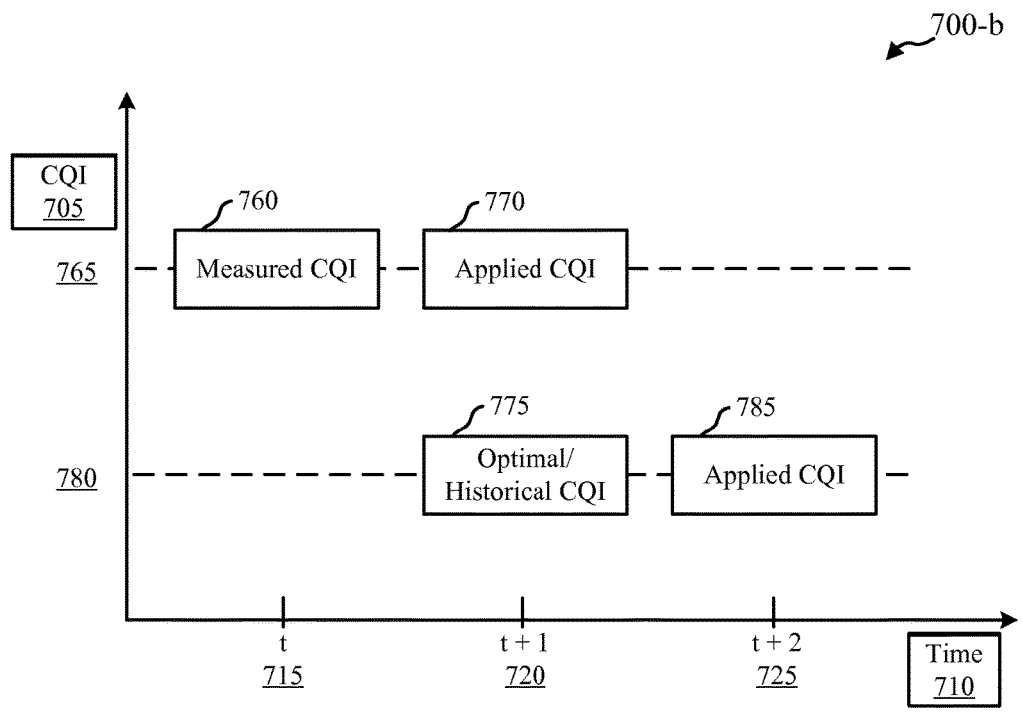
FIG. 7B shows a diagram of another example of measured versus optimal/historical CQI relative to time, according to one aspect of the principles described herein.

In reference to FIGS. 7A and 7B, two graphs 700-a and 700-b show examples of measured versus optimal/historical CQI relative to time, according to one aspect of the principles described herein. The graphs 700-a and 700-b may represent CQI data for a mobile device 115 of one or more of the wireless communications systems 100, 200, 300, 400, 500, and/or 600 described above in reference to previous Figures.

Each graph 700-a, 700-b is represented by a CQI value 705 on the vertical axis versus time 710 on the horizontal axis. In particular reference to graph 700-a, a measured CQI 730 at time t 715 is at a first CQI value 735. This represents a CQI value measured by a mobile device 115 or base station 105. The applied CQI 740 at time t+1 720 may be selected to correspond to the measured CQI 730 at CQI value 735. In some cases the CQI value 735 may be any integer from 1-15. Based on historical data, however, the optimal CQI 745 may be at a CQI value 750, which may be determined, for example, at time t+1 720. CQI value 750 may be x integer multiples higher than CQI value 735. Based on the historical/optimal CQI 745, the applied CQI 755 at time t+2 725 may also be selected at CQI value 750. By using historical/optimal CQI 745 at CQI value 750 initially via the techniques described above, instead of using the measured CQI 730 at CQI value 735, the applied CQI 740 at time t+1 720 may be at the CQI value 750. Using the historical/optimal CQI 745 initially at time t 715, channel performance, throughput, etc., may be increased by preventing underestimating of the CQI value.

It should be appreciated that CQI is only used as an example in describing results from the techniques described herein. Other channel parameters and/or conditions may be substituted for CQI with similar affect.

In reference now to graph 700-b in particular, another example of measured versus applied CQI is show relative to CQI value 705 on the vertical axis and time 710 on the horizontal axis. Whereas graph 700-a showed an example of underestimating CQI when using measured CQI without historical CQI information, graph 700-b illustrates an example of overestimating CQI without using historical CQI information.

At time t 715, the measured CQI value 760, such as measured by a mobile device 115 and/or base station 105, may be at a first CQI value 765. Based on the measured CQI 760, a mobile device 115 or base station 105 may apply a CQI 770 at the same first CQI value 765 at time t+1 720. However, based on historical CQI information, the optimal CQI 775 at time t+1 720 may be at a second lower CQI value 780. Based on the historical/optimal CQI 775, the applied CQI 785 at time t+2 may also be at the second CQI value 780. By using the historical CQI 775 at CQI value 780 at time t 715, the CQI applied at time t+1 720 may be better matched with the historical/optimal CQI 775 to improve communication performance.

Figure 8:
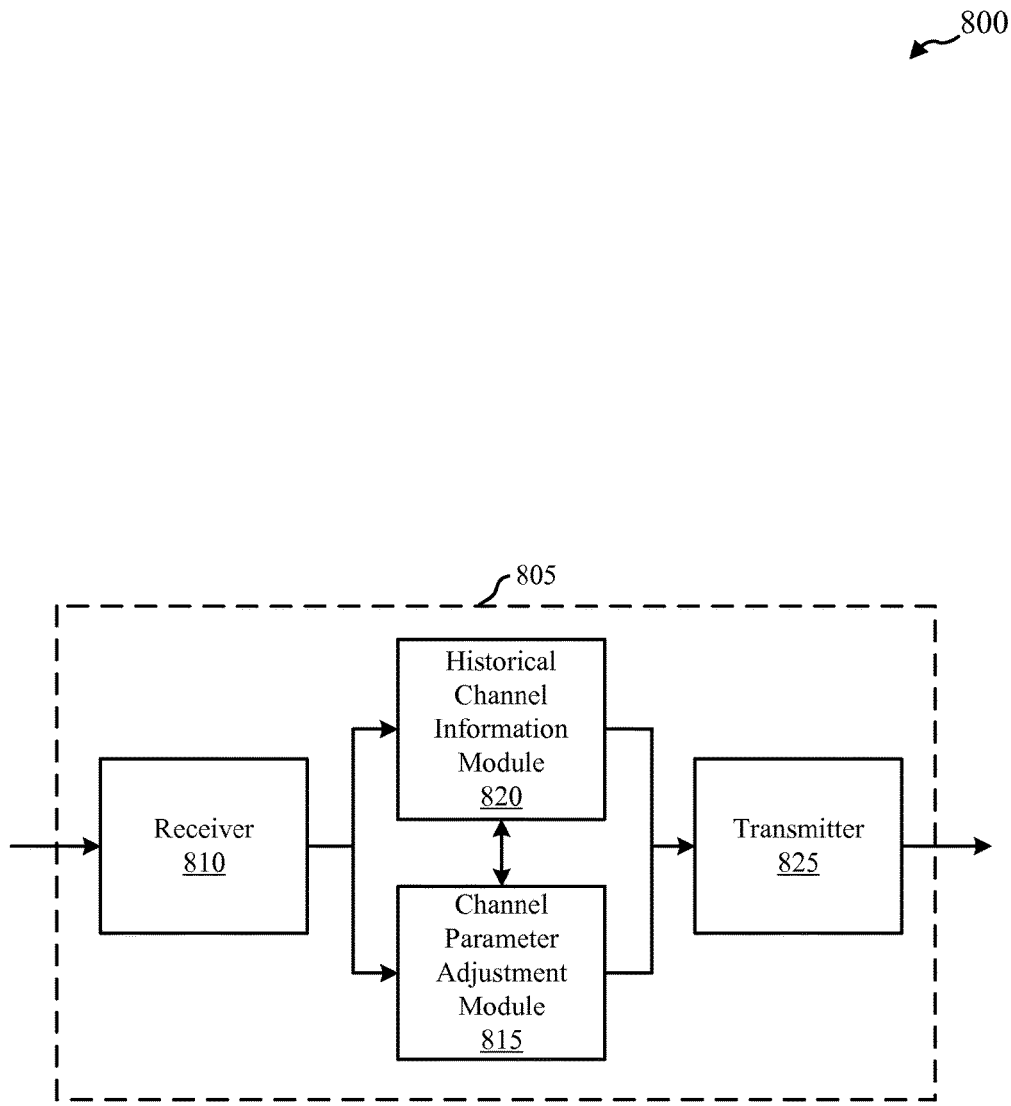
FIG. 8 shows a block diagram of one example of a wireless communications device capable of adjusting one or more channel parameters based on historical channel information, according to one aspect of the principles described herein.

FIG. 8 shows a block diagram 800 of a device 805 configured for adjusting at least one channel parameter based on historical channel information associated with mobility patterns of a mobile device in accordance with various examples. The device 805 may represent one or more of the mobile devices 115 or base stations 105 described in previous Figures. The device 805 may also implement one or more of the processes 400, 500, and/or 600 as described above in reference to FIGS. 4-6. The device 805 may include a receiver 810, a channel parameter adjustment module 815, a historical channel information module 820, and/or a transmitter 820. Each of these components may be in communication with each other.

The receiver 810 may receive information such as packet, data, and/or signaling information regarding what the device 805 has received or transmitted. The received information may be utilized by the channel parameter adjustment module 815 for a variety of purposes. In some cases, receiver 810 may be configured to receive data or transmissions, for example from another device, such as from a mobile device 115 and/or a base station 105, to further enable the various techniques described above for adapting one or more channel parameters based on historical data.

The transmitter 825 may similarly transmit information such as packet, data, and/or signaling information from the device 805. In some cases, transmitter 825 may be configured to send data according to various examples described herein, such as to one or more mobile devices 115 and/or base stations 105.

In one example, device 805 may be a mobile device 115 implementing one or more aspects of mobile device 115 described above in reference to previous Figures. The channel parameter adjustment module 815 may be configured to determine mobility patterns of device 805, such as via GPS, communicating with a serving base station 105 to obtain such information, etc. The channel parameter adjustment module 815 may then communicate with the historical channel information module 820 to access any historical channel information associated with the current mobility patterns of device 805.

The historical channel information associated with mobility patterns of device 805 may be information previously obtained by and stored in the local memory of device 805, accessibly by the historical channel information module 820. The historical channel information may also be historical channel information obtained by another mobile device 115 stored in the network. The historical channel information module 820, via the receiver 810 and transmitter 825 may obtain historical channel information stored in the network via a serving base station 105. The historical channel information module 820 may configure a data request message and communicate the data request message to the transmitter to be communicated to a serving base station 105. The receiver 810 may receive a response message including relevant historical channel information corresponding to the current mobility patterns of device 805.

The channel parameter adjustment module 815 may then adjust one or more channel parameters based on the accessed relevant historical channel information from the historical channel information module 820. The channel parameters may include CQI, RI, PMI, RSSI, RSRP, or other indication of channel quality. The one or more adjusted channel parameters may then be reported to the serving base station 105. Based on the adjusted one or more channel parameters received from device 805, the serving base station 105 may adapt one or more downlink channel parameters, such as, maximum transmit power, MIMO scheme, modulation scheme, coding scheme, tone allocation, etc., to improve communication performance with device 805.

In another example, device 805 may be an example of a base station 105 implementing one or more aspects of base stations 105 described above in reference to previous Figures. The channel parameter adjustment module 815 may be configured to determine mobility patterns of a mobile device 115 served by base station 805, such as via GPS, requesting mobility information from the served mobile device 115 itself, or via other location determination methods. The channel parameter adjustment module 815 may then communicate with the historical channel information module 820 to access any historical channel information associated with the current mobility patterns of a served mobile device 115.

The historical channel information associated with mobility patterns of the served mobile device 115 may be information previously obtained by and stored in the local memory of the mobile device 115. The historical channel information module 820, via the receiver 810 and transmitter 825 may obtain historical channel information stored in the local memory of served mobile device 115. The historical channel information module 820 may configure a data request message and communicate the data request message to the transmitter to be communicated to the mobile device 115. The receiver 810 may receive a response message including relevant historical channel information corresponding to the current mobility patterns of the mobile device 115. The historical channel information may also be historical channel information associated with mobility patterns of another mobile device 115 stored in the network and/or in memory of device 805.

The channel parameter adjustment module 815 may then adjust one or more channel parameters based on the accessed relevant historical channel information from the historical channel information module 820. The device 805 may directly adjust one or more channel parameters, such as CQI, RI, PMI, RSSI, or RSRP, or other indication of channel quality. Additionally or alternatively, device 805 may adjust one or more channel parameters signaled to the served mobile device 115, such as a modulation scheme, a MIMO scheme such as a spatial diversity, spatial multiplexing, etc., a coding scheme, a tone allocation, etc., to improve communications performance with the mobile device 115.

Figure 9:
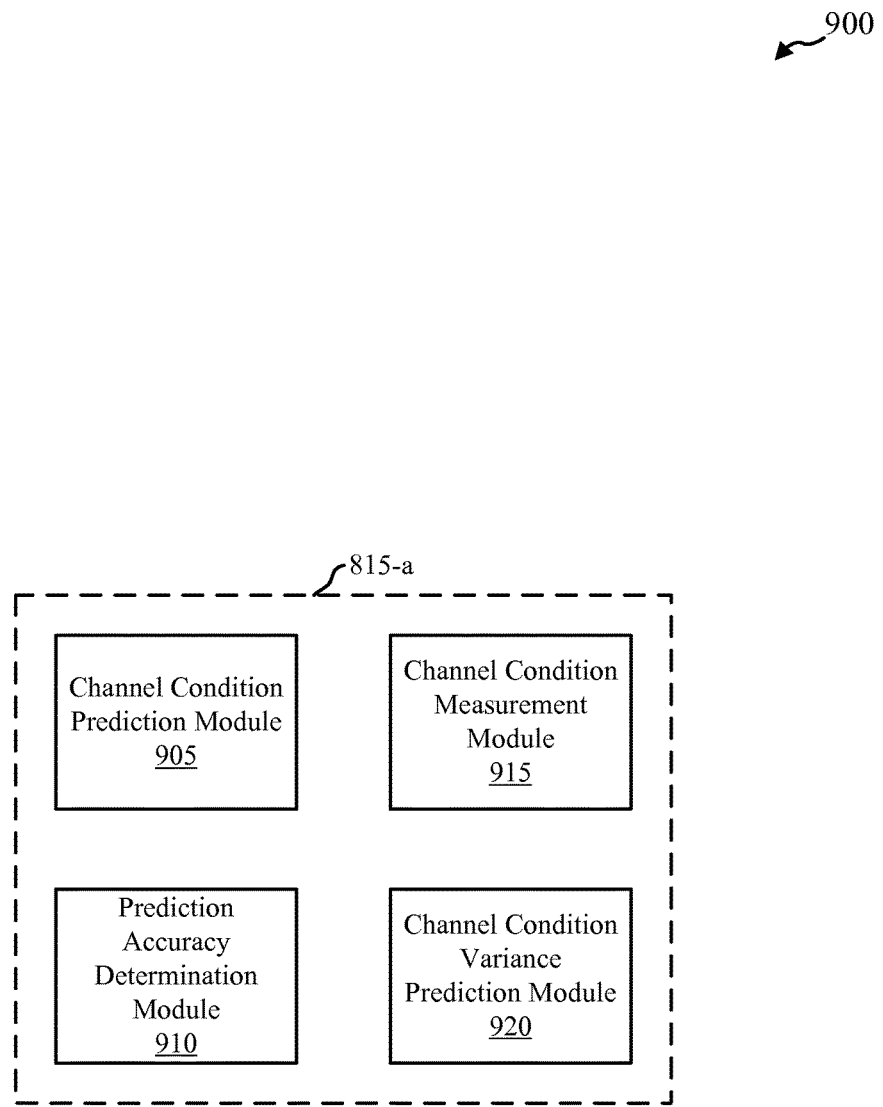
FIG. 9 shows a block diagram of a detailed example of the Channel Parameter Adjustment Module of FIG. 7, according to one aspect of the principles described herein.

FIG. 9 shows a block diagram 900 of an example of the channel parameter adjustment module 815-*a*. The channel parameter adjustment module 815-*a* may be an example of the channel parameter adjustment module 815 described in reference to FIG. 8, and may be implemented in or part of mobile devices 115 and/or base stations 105 described in reference to previous Figures. The channel parameter adjustment module 815-*a*, in conjunction with the historical channel information module 820 of FIG. 8, may implement one or more of processes 400, 500, and/or 600 as described above in reference to FIGS. 4-6. The channel parameter adjustment module 815-*a* may include a channel condition prediction module 905, a prediction accuracy determination module 910, a channel condition measurement module 915, and/or a channel condition variance prediction module 920. Each of these components may be in communication with each other. In other examples, one or more of the channel condition prediction module 905, the prediction accuracy determination module 910, the channel condition measurement module 915, and/or the channel condition variance prediction module 920 may be implemented in the channel parameter adjustment module 815-*a*.

In one aspect, the channel parameter adjustment module 815-*a* may receive/access historical channel information associated with mobility parameters of a mobile device 115 from the historical channel information module 820 described in reference to FIG. 8. Using the historical channel information, the channel condition prediction module 905 may predict one or more current channel conditions of a communication channel utilized by device 805 via the techniques described above in reference to previous Figures. The one or more channel conditions may include CQI, RI, PMI, RSSI, RSRP, etc.

In one aspect, the channel condition prediction module 905 may communicate the one or more predicted current channel conditions to the prediction accuracy determination module 910. Based on the historical channel information, the prediction accuracy determination module 910 may predict an accuracy value of the predicted current channel condition(s). The prediction accuracy determination module 910 may predict an accuracy value by comparing the mobility patterns of the mobile device 115 with the historical mobility information associated with the historical channel conditions according to the techniques described above. If the accuracy value fails to meets a threshold value (e.g. is greater than a determined confidence level), the prediction accuracy determination module 910 may confirm that the predicted current channel condition received from the channel condition prediction module 905 is to be used to adjust one or more channel parameters. Adjusting the one or more channel parameters may include using the predicted current channel condition directly, e.g. transmitting the predicted channel condition to the sender of the communication being analyzed. Adjusting the one or more channel parameters may include using the predicted current channel condition indirectly, e.g. as a basis for adjusting one or more channel parameters, or as information to enable the sending device to adjust one or more channel parameters, according to the techniques described above.

In one aspect, if the accuracy value predicted by prediction accuracy determination module 910 meets the threshold value (e.g. is less than a determined confidence level), the prediction accuracy determination module 910 may instruct the channel condition measurement module 915 to measure one or more current channel conditions. Alternatively, the prediction accuracy determination module 910 may communicate the accuracy value to the channel condition measurement module 915, and the channel condition measurement module 915 may determine when to measure one or more current channel conditions. Accordingly, adjusting one or more channel parameters may then be based on the measured channel conditions, the predicted channel condition(s), and/or the historical channel information.

In one aspect, the channel condition variance prediction module 920, using historical channel information received from the historical channel information module 820, may predict a variance in one or more channel conditions. In one example, the channel condition variance prediction module 920 may compare historical information for multiple data points, e.g. historical channel information associated with multiple locations and times, to determine a delta metric. The delta metric or variance may predict how much and at what rate a given channel condition, such as CQI, RI, PMI, RSSI, RSRP, etc., may change. In some cases, the predicted variance may include a measure of channel condition uncertainty, such as including some other moment of the distribution, e.g. skewness ($3^{rd}$ moment) or kurtosis ($4^{th}$ moment) or some fractional moments. The variance information, in addition to the predicted channel condition, the measured channel condition, the predicted accuracy, and/or the historical channel information may then be used to adjust one or more channel parameters.

Figure 10:
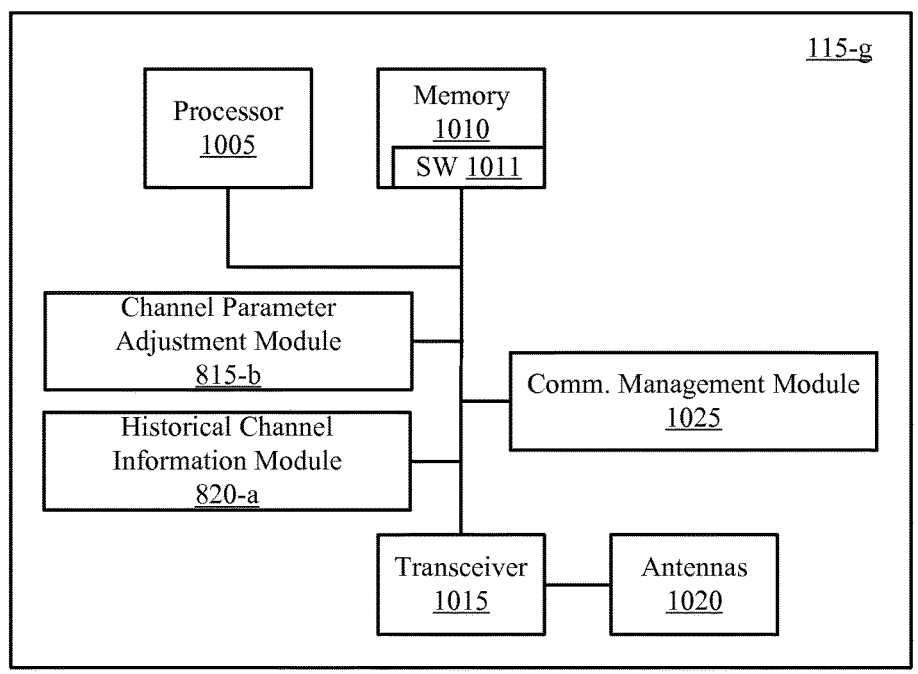
FIG. 10 shows a block diagram of an example of a mobile device capable of adjusting one or more channel parameters based on historical channel information, according to one aspect of the principles described herein.

FIG. 10 shows a block diagram of one example of a mobile device 115-g, according to one aspect of the principles described herein. The mobile device 115-g may be an example of one or more of the mobile devices 115 described above with reference to the previous Figures.

The mobile device 115-g of FIG. 10 may include a processor 1005, a memory 1010, a transceiver 1015, one or more antennas 1020, a communication management module 1025, a channel parameter adjustment module 815-b, and a historical channel information module 820-a. Each of these components may be in communication, directly or indirectly.

The memory 1010 may include random access memory (RAM) and/or read-only memory (ROM). The memory 1010 may store computer-readable, computer-executable software (SW) code 1011 containing instructions that are configured to, when executed, cause the processor 1005 to perform various functions described herein for communicating over a wireless communications system. Alternatively, the software code 1011 may not be directly executable by the processor 1005 but may be configured to cause the mobile device 115-g (e.g., when compiled and executed) to perform various of the functions described herein.

The processor 1005 may include an intelligent hardware device, e.g., a central processing unit (CPU) such as an ARM® based processor, a microcontroller, an ASIC, etc. The processor 1005 may process information received through the transceiver(s) 1015 and/or information to be sent to the transceiver(s) 1015 for transmission through the antenna(s) 1020. The processor 1005 may handle, alone or in connection with the communication management module 1025, various aspects of communicating over a wireless communications system and/or detecting a communications network.

The transceiver(s) 1015 may include a modem configured to modulate packets and provide the modulated packets to the antenna(s) 1020 for transmission, and to demodulate packets received from the antenna(s) 1020. The transceiver(s) 1015 may in some cases be implemented as one or more transmitters and one or more separate receivers. The transceiver(s) 1015 may be configured to communicate bi-directionally, via the antenna(s) 1020, with one or more base stations 105 described with reference to previous Figures.

The components of the mobile device 115-g may be configured to implement aspects discussed above with respect to the mobile devices 115 of previous Figures, and may not be repeated here for the sake of brevity. For example, the channel parameter adjustment module 815-b may include similar functionality as the channel parameter adjustment module 815 of FIGS. 8 and/or 9. The historical channel information module 820-a may include similar functionality as the historical channel information module 820 of FIG. 8. The channel parameter adjustment module 815-b and the historical channel information module 820-a may enable mobile device 115-g to adjust one or more channel parameters for communications with a serving base station 105 based on historical channel information associated with mobility patterns of a mobile device 115.

In some examples, the transceiver 1015 in conjunction with antenna(s) 1020, along with other possible components of the mobile device 115-g, may receive transmissions from one or more base stations 105 and may transmit uplink data from the to one or more base stations 105 or a core network 130 via the techniques described herein. In some examples, the transceiver 1015, in conjunction with antennas 1020 along with other possible components of mobile device 115-g, including memory 1010, may enable the mobile device 115-g to access historical information associated with mobility patterns of a mobile device 115. The historical information may be stored in the memory 1010, such as information relating to previous communications of the mobile device 115-g, or may be of other mobile devices 115 accessed through the network via transceiver 1015 and antennas 1020.

Figure 11:
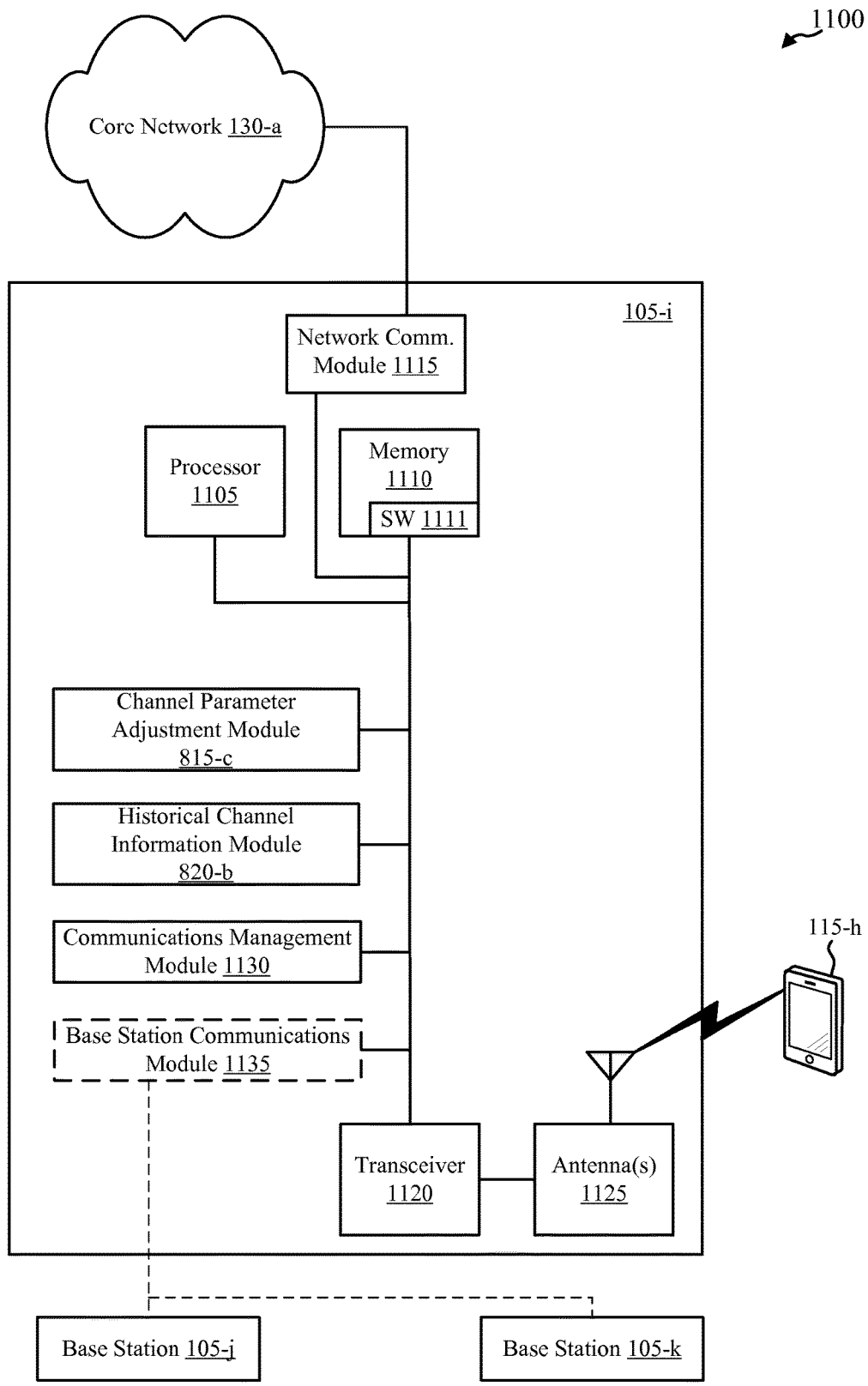
FIG. 11 shows a block diagram of an example of a base station capable of adjusting one or more channel parameters based on historical channel information, according to one aspect of the principles described herein.

FIG. 11 shows a block diagram 1100 of one example of a base station 105-i, according to one aspect of the principles described herein. The base station 105-may be an example of one or more of the base stations 105 described above with reference to the previous Figures. The base station 105-may be associated with a serving cell of one or more of the mobile devices 115 described above with reference to the previous Figures.

The base station 105-of FIG. 11 may include a processor 1105, a memory 1110 implementing software 1111, a network communication module 1115, one or more transceivers 1120, one or more antennas 1125, a communications management module 1130, a base station communications module 1135, a channel parameter adjustment module 815-c, and a historical channel information module 820-b. Each of these components may be in communication, directly or indirectly.

The memory 1110 may include random access memory (RAM) and read-only memory (ROM). The memory 1110 may store computer-readable, computer-executable software code 1111 containing instructions that are configured to, when executed, cause the processor 1105 to perform various functions described herein (e.g., data capture, database management, message routing, etc.). Alternatively, the software code 1111 may not be directly executable by the processor 1105 but be configured to cause the computer (e.g., when compiled and executed) to perform functions described herein.

The processor 1105 may include an intelligent hardware device, e.g., a central processing unit (CPU) such as those made by Intel® Corporation, AMD®, or an ARM® based processor, a microcontroller, an application specific integrated circuit (ASIC), etc.

According to the architecture of FIG. 11, the base station 105-may further include a network communications module 1115. The network communications module 1115 may manage communications with the core network 130-a and may be in communication with some or all of the components of base station 105-i. Alternatively, functionality of the network communications module 1115 may be implemented as a component of the transceiver 1120, as a computer program product, and/or as one or more controller elements of the processor 1105.

The base station 105-may further include a communications management module 1130. The communications management module 1130 may manage communications with mobile devices 115, such as mobile device 115-h. In some examples, base station 105-may also include a base station communications module 1135 that manages communications with other base stations 105-j and 105-k. By way of example, the communications management module 1130 and/or the base station communications module 1135 may be in communication with some or all of the other components of the base station 105-i. Alternatively, functionality of the communications management module 1130 and/or the base station communications module 1135 may be implemented as a component of the transceiver 1120, as a computer program product, and/or as one or more controller elements of the processor 1105.

The components of the base station 105-may be configured to implement aspects discussed above with respect to base stations 105 described in reference to previous Figures and may not be repeated here for the sake of brevity. For example, the channel parameter adjustment module 815-c may include similar functionality as channel parameter adjustment module 815 of FIGS. 8, 9, and/or 10. Similarly, the historical channel information module 820-b may include similar functionality as the historical channel information module 820 of FIGS. 8 and/or 10.

In some examples, the transceiver 1120 in conjunction with antenna(s) 1125, along with other possible components of the base station 105-i, may receive transmissions from one or more mobile devices 115 and may transmit downlink data to one or more mobile devices 115 via the techniques described herein. In some examples, the transceiver 1120, in conjunction with antennas 1125 along with other possible components of base station 105-i, including memory 1110, may enable the base station 105-I to access historical information associated with mobility patterns of a mobile device 115 that correspond to mobility patterns of a currently served mobile device 115-h. The historical information may be stored in the memory 1110 of the base station 105-i, such as information relating to previous communications between base station 105-and the mobile device 115-h or another mobile device 115. The historical information may also be associated with communications between another base station 105-j and/or 105-k with mobile device 115-h or another mobile device 115. In this case, the historical information may be accessed via the processor 1105 via the base station communications module 1135 and/or the network communications module 1115. In this way, a greater amount of historical channel information associated with various mobility patterns of multiple mobile devices 115 may be accessed by base station 105-and utilized to adjust one or more channel parameters to improve uplink and downlink communications with mobile device 115-h.

Figure 12:
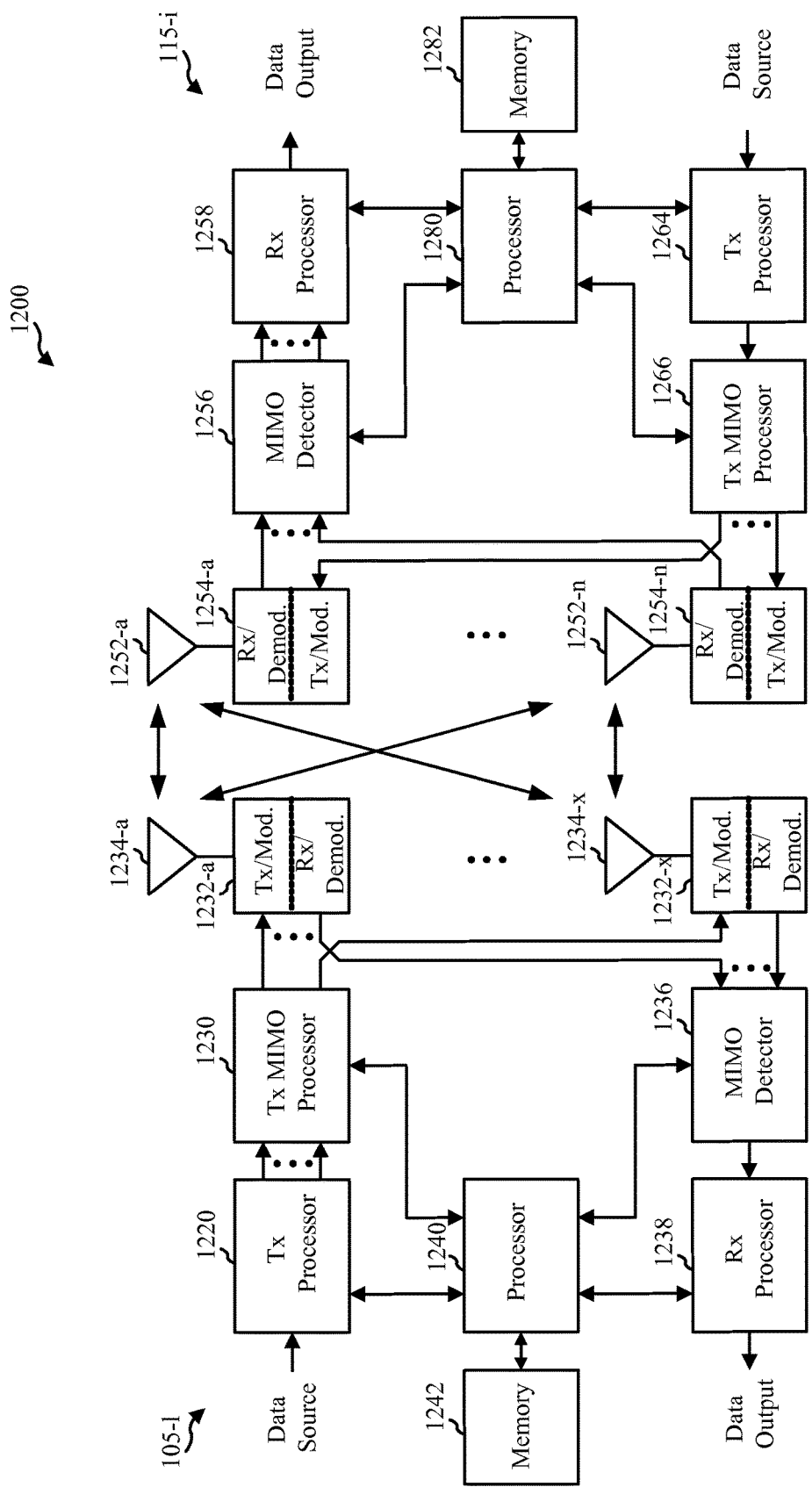
FIG. 12 shows a block diagram of a wireless communications system, according to one aspect of the principles described herein.

FIG. 12 shows a block diagram of a wireless communications system 1200, according to one aspect of the principles described herein. Specifically, FIG. 12 illustrates a design of a base station 105-1 and a mobile device 115-i, in accordance with an aspect of the present disclosure. The wireless communications system 1200 may illustrate aspects of one or more of the wireless communications systems 100, 200, 300 of FIGS. 1,2, 3A, and/or 3B, implement aspects of one or more processes 400, 500, 600 of FIGS. 4, 5, and/or 6, and/or provide channel characteristics according to the graphs 700-a and/or 700-b of FIGS. 7A and/or 7B. Furthermore, base station 105-1 and/or mobile device 115-may include some or all aspects of the base stations 105 and mobile devices 115 described in reference to any of the previous Figures.

The base station 105-1 may be equipped with base station antennas 1234-a through 834-x, where x is a positive integer, and the mobile device 115-may be equipped with mobile device antennas 1252-a through 1252-n, where n is a positive integer. In the wireless communications system 1200, the base station 105-1 may be able to send data over multiple communication links at the same time. Each communication link may be called a "layer" and the "rank" of the communication link may indicate the number of layers used for communication. For example, in a 2×2 MIMO system where base station 105-1 transmits two "layers," the rank of the communication link between the base station 105-1 and the mobile device 115-is two.

At the base station 105-1, a base station transmit processor 1220 may receive data from a base station data source and control information from a base station controller/processor 1240. The control information may be for the PBCH, PCFICH, PHICH, PDCCH, etc. The data may be for the PDSCH, etc. The base station transmit processor 1220 may process (e.g., encode and symbol map) the data and control information to obtain data symbols and control symbols, respectively. The base station transmit processor 1220 may also generate reference symbols, e.g., for the PSS, SSS, and cell-specific reference signal. A base station transmit (TX) MIMO processor 1230 may perform spatial processing (e.g., precoding) on data symbols, control symbols, and/or reference symbols, if applicable, and may provide output symbol streams to the base station transmit modulators 1232-*a* through 1232-*x*. Each base station modulator 1232 may process a respective output symbol stream (e.g., for OFDM, etc.) to obtain an output sample stream. Each base station modulator 1232 may further process (e.g., convert to analog, amplify, filter, and upconvert) the output sample stream to obtain a downlink (DL) signal. In one example, DL signals from base station modulators 1232-*a* through 1232-*x* may be transmitted via the base station antennas 1234-*a* through 1234-*x*, respectively.

At the mobile device 115-*i*, the mobile device antennas 1252-*a* through 1252-*n* may receive the DL signals from the base station 105-1 and may provide the received signals to the mobile device demodulators 1254-*a* through 1254-*n*, respectively. Each mobile device demodulator 1254 may condition (e.g., filter, amplify, downconvert, and digitize) a respective received signal to obtain input samples. Each mobile device demodulator 1254 may further process the input samples (e.g., for OFDM, etc.) to obtain received symbols. A mobile device MIMO detector 1256 may obtain received symbols from all the demodulators 1254-*a* through 1254-*n*, perform MIMO detection on the received symbols if applicable, and provide detected symbols. A mobile device receiver (Rx) processor 1258 may process (e.g., demodulate, deinterleave, and decode) the detected symbols, providing decoded data for the mobile device 115-to a data output, and provide decoded control information to a mobile device processor 1280, or mobile device memory 1282.

On the uplink (UL), at the mobile device 115-*i*, a mobile device transmit processor 1264 may receive and process data from a mobile device data source. The mobile device transmit processor 1264 may also generate reference symbols for a reference signal. The symbols from the mobile device transmit processor 1264 may be precoded by a mobile device transmit MIMO processor 1266 if applicable, further processed by the mobile device demodulators 1254-*a* through 1254-*n* (e.g., for SC-FDMA, etc.), and be transmitted to the base station 105-1 in accordance with the transmission parameters received from the base station 105-1. At the base station 105-1, the UL signals from the mobile device 115-may be received by the base station antennas 1234, processed by the base station demodulators 1232, detected by a base station MIMO detector 1236 if applicable, and further processed by a base station receive processor 1238. The base station receive processor 1238 may provide decoded data to a base station data output and to the base station processor 1240.

The components of the mobile device 115-may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1200. Similarly, the components of the base station 105-1 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1200.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

A channel response may be estimated by each of the receive processors 1238, 1258 of the base station 105-1 and the mobile device 115-*i*. The estimated channel response may be used to perform space, space/time processing at the receiver, adjust power levels, change modulation rates or schemes, or other actions. Each receive processor 1238, 1258 may further estimate the signal-to-noise-and-interference ratios (SNRs) of the detected symbol streams, and possibly other channel characteristics, and provides these quantities to a processor 1240, 1280. The receive processors 1238, 1258 or the processors 1240, 1280 may further derive an estimate of the "operating" SNR for the system. Processors 1240, 1280 may then provide channel state information (CSI), which may comprise various types of information regarding the communication link and/or the received data stream. For example, the CSI may comprise only the operating SNR. In other aspects, the CSI may comprise a channel quality indicator (CQI), which may be a numerical value indicative of one or more channel conditions. The CSI is then processed by a transmit processor 1220, 1264, modulated by modulators 1232, 1254, and transmitted via antennas 1234, 1252.

In one configuration, the base station 105-1 may operate as a serving base station 105-1 for the mobile device 115-*i*, and may include means for accessing historical channel information associated with mobility patterns of a mobile device 115 and adjusting one or more channel parameters for communication (uplink and/or downlink) with the mobile device 115-*i*. In one aspect, the aforementioned means may be the base station controller/processor 1240, the base station memory 1242, the base station transmit processor 1220, base station receive processor 1238, the base station modulators/demodulators 1232, and the base station antennas 1234 of the base station 105-1 configured to perform the functions recited by the aforementioned means.

In an additional or alternative configuration, the mobile device 115-may include means for accessing historical channel information associated with mobility patterns of the mobile device 115-or another mobile device 115 and adjusting one or more channel parameters for communication (uplink and/or downlink) with the base station 105-1. In one aspect, the aforementioned means may be the mobile device controller/processor 1280, the mobile device memory 1282, the mobile device transmit processor 1264, mobile device receive processor 1258, the mobile device modulators/demodulators 1254, and the mobile device antennas 1252 configured to perform the functions recited by the aforementioned means.

Figure 13:
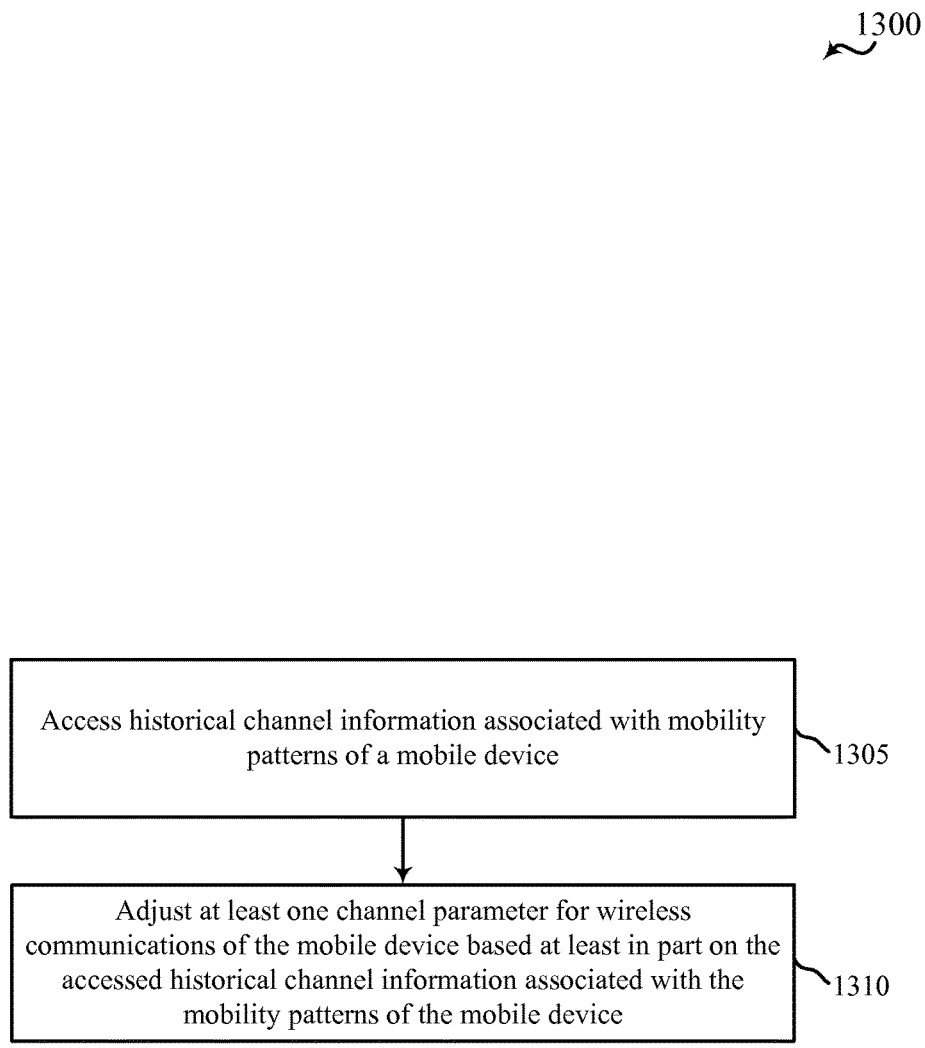
FIG. 13 shows a flowchart diagram of a method for adjusting one or more channel parameters based on historical channel information, according to one aspect of the principles described herein.

FIG. 13 shows a flowchart diagram of a method 1300 for adjusting one or more channel parameters based on historical information associated with mobility patterns of a mobile device, in accordance with an aspect of the present disclosure. Specifically, FIG. 13 illustrates a method 1300 of improving network and/or mobile device performance based on accessing and predicting the behavior of a mobile device. The method 1300 may illustrate aspects of one or more of the wireless communications systems 100, 200, 300, 1200 of FIGS. 1, 2, 3A, 3B, and/or 12, implement aspects of one or more of the processes 400, 500, 600 of FIGS. 4, 5, and/or 6, and/or provide channel characteristics as exemplified by the graphs 700-a and/or 700-b of FIGS. 7A and/or 7B. The method 1300 may be performed by the device 805 of FIG. 8, and/or any of the base stations 105 and/or the mobile devices 115 described in reference to the previous Figures. For ease of reference, the method 1300 will be described from the perspective of device 805 of FIG. 8. However, it should be appreciated that any network device may perform method 1300.

At block 1305, historical information associated with mobility patterns of a mobile device may be accessed. The historical information may include channel information, such as CQI, RI, PMI, RSSI, RSRP, etc., associated with a geographic location, trajectory, time, and/or previously traveled route of a mobile device 115. The historical information may be accessed via the network, one or more base stations 105, and/or via a local memory of the device 805 performing method 1300.

At block 1310, the device 805 may adjust at least one channel parameter for wireless communications of the mobile device (e.g. device 805 or mobile device 115) based at least in part on the accessed historical channel information associated with the mobility patterns of the mobile device.

It should be noted that the method 1300 is just one implementation and that the operations of the method 1300 may be rearranged or otherwise modified such that other implementations are possible.

Figure 14:
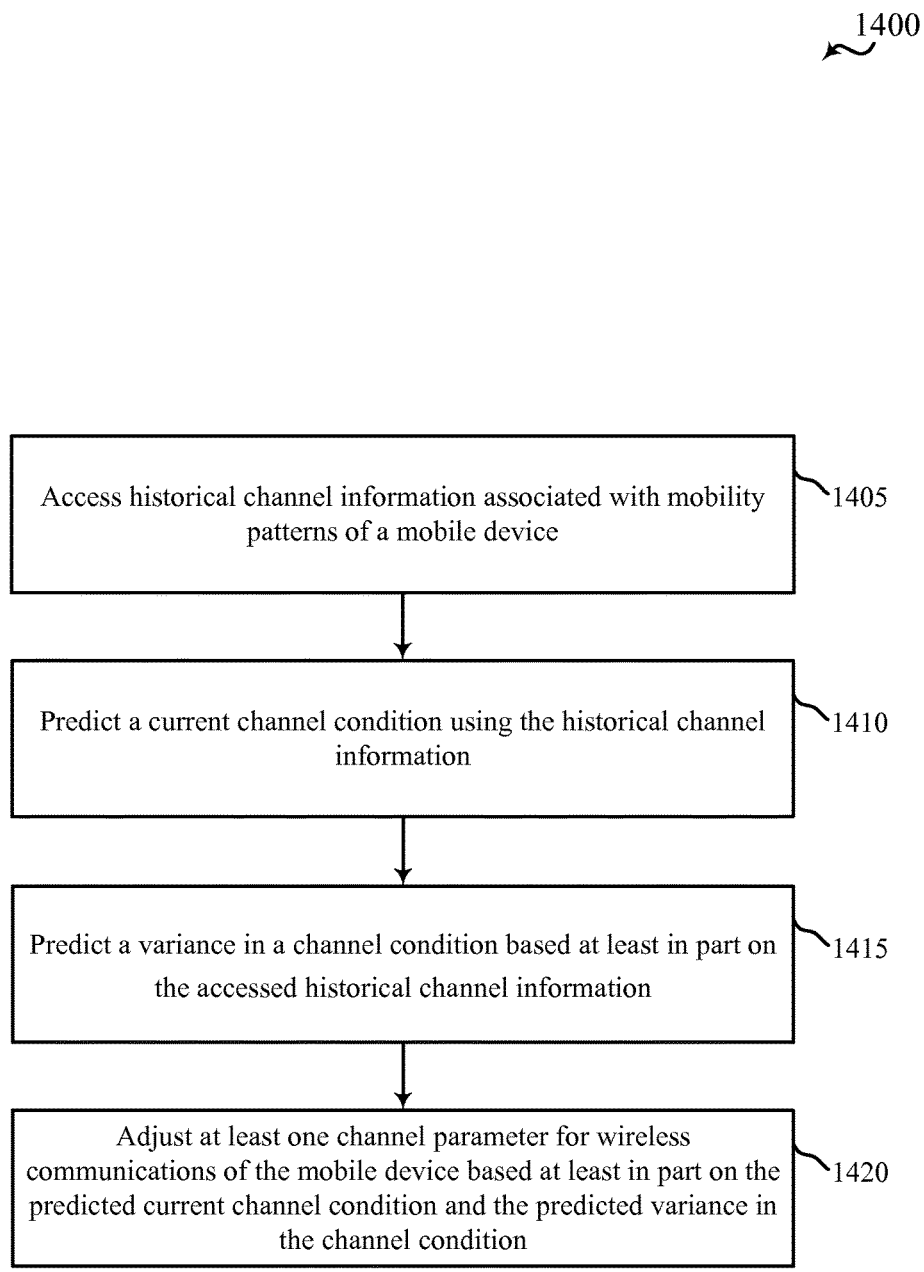
FIG. 14 shows a flowchart diagram of another method for adjusting one or more channel parameters based on historical channel information, according to one aspect of the principles described herein.

FIG. 14 shows a flowchart diagram of another method 1400 for adjusting one or more channel parameters based on historical information associated with mobility patterns of a mobile device, in accordance with an aspect of the present disclosure. Specifically, FIG. 14 illustrates a method 1400 of improving communication performance between a mobile device and a serving base station in light of varying channel conditions based on accessing and predicting the behavior of a mobile device. The method 1400 may illustrate aspects of one or more of the wireless communications systems 100, 200, 300, 1200, 1300 of FIGS. 1,2, 3A, 3B, 12, and/or 13, implement aspects of one or more of the processes 400, 500, 600 of FIGS. 4, 5, and/or 6, and/or provide channel characteristics as exemplified by the graphs 700-a and/or 700-b of FIGS. 7A and/or 7B. The method 1400 may be performed by the device 805 of FIG. 8, and/or any of the base stations 105 and/or the mobile devices 115 described in reference to the previous Figures. For ease of reference, the method 1400 will be described from the perspective of device 805 of FIG. 8. However, it should be appreciated that any network device may perform method 1400.

At block 1405, historical information associated with mobility patterns of a mobile device may be accessed. The historical information may include channel information, such as CQI, RI, PMI, RSSI, RSRP, etc., associated with a geographic location, time, and/or previously traveled route of a mobile device 115. The historical information may be accessed via the network, one or more base stations 105, and/or via a local memory of the device 805 performing method 1300.

At block 1410, the device 805 may predict a current channel condition using the historical channel information. The current channel condition may include CQI, or any other similar channel metric. The device 805 may compare geographic, time of day, and/or route information associated with the historical channel information of a mobile device with current geographic, time, and/or route information of the served mobile device (which may in some cases be device 805) to predict the current channel condition.

At block 1415, the device 805 may predict a variance in a channel condition based at least in part on the accessed historical channel information. Predicting the variance in the channel condition may include comparing historical information for multiple data points, e.g. historical channel information associated with multiple locations and times, to determine a delta metric. In some cases, the predicted variance may include a measure of channel condition uncertainty, such as including some other moment of the distribution, e.g. skewness ($3^{rd}$ moment) or kurtosis ($4^{th}$ moment) or some fractional moments. The delta metric or variance may predict how much and at what rate a given channel condition, such as CQI, RI, PMI, RSSI, RSRP, etc., may change.

At block 1420, the device 805 may adjust at least one channel parameter for wireless communications of the mobile device (e.g., device 805 and/or a mobile device 115) based at least in part on the predicted current channel condition and the predicted variance in the channel condition, according to the techniques described above. Adjusting the at least one channel parameter may include weighting the predicted variance based on how many data points of the historical information correspond to data points of the current trajectory of the served mobile device (which may in some cases be device 805). The weighted predicted variance may then be combined with the predicted current channel condition to derive a closer approximation to actual channel conditions without requiring a new measurement of the one or more channel conditions.

It should be noted that the method 1400 is just one implementation and that the operations of the method 1400 may be rearranged or otherwise modified such that other implementations are possible.

Figure 15:
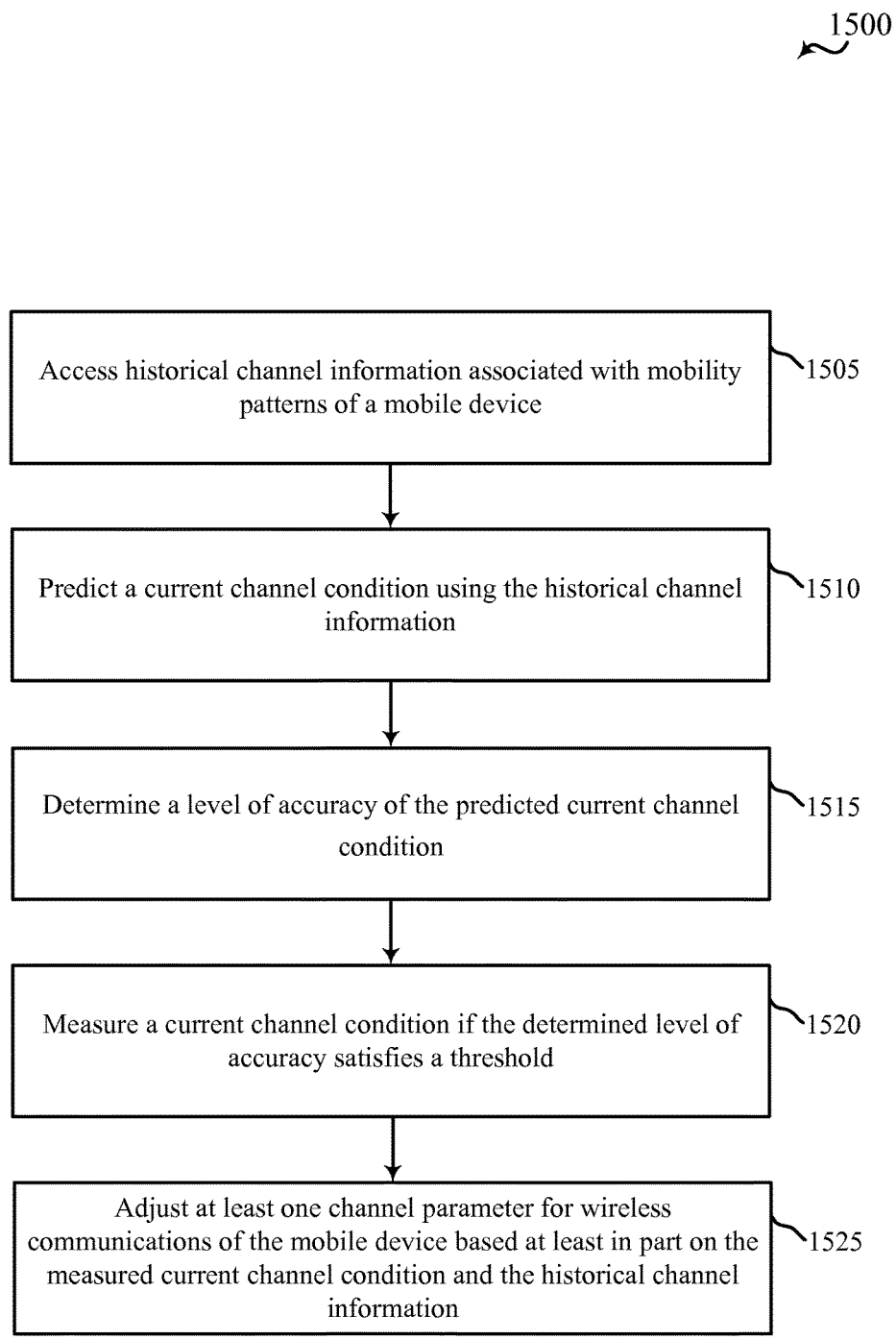
FIG. 15 shows a flowchart diagram of another method for adjusting one or more channel parameters based on historical channel information, according to one aspect of the principles described herein.

FIG. 15 shows a flowchart diagram of another method 1500 for adjusting one or more channel parameters based on historical information associated with mobility patterns of a mobile device, in accordance with an aspect of the present disclosure. Specifically, FIG. 15 illustrates a method 1500 of improving communication performance between a mobile device and a serving base station in light of varying channel conditions based on accessing and predicting the behavior of a mobile device. The method 1500 may illustrate aspects of one or more of the wireless communications systems 100, 200, 300, 1200, 1300, 1400 of FIGS. 1, 2, 3A, 3B, 12, 13, and/or 14, implement aspects of one or more of the processes 400, 500, 600 of FIGS. 4, 5, and/or 6, and/or provide channel characteristics as exemplified by the graphs 700-a and/or 700-b of FIGS. 7A and/or 7B. The method 1500 may be performed by the device 805 of FIG. 8, and/or any of the base stations 105 and/or the mobile devices 115 described in reference to the previous Figures. For ease of reference, the method 1500 will be described from the perspective of device 805 of FIG. 8. However, it should be appreciated that any network device may perform method 1500.

At block 1505, historical information associated with mobility patterns of a mobile device may be accessed. The historical information may include channel information, such as CQI, RSSI, RSRP, etc., associated with a geographic location, time, and/or previously traveled route of a mobile device 115. The historical information may be access via the network, one or more base stations 105, and/or via a local memory of the device 805 performing method 1300.

At block 1510, the device 805 may predict a current channel condition using the historical channel information. The current channel condition may include CQI, or any other similar channel metric.

At block 1515, the device 805 may determine a level of accuracy of the predicted current channel condition. The device 805 may base the level of accuracy determination on a comparison of the historical channel information data points (corresponding to location and time, for example), with the current mobility patterns of the served mobile device 115 (which in some examples may include device 805). For example, the more data points that match (or are within a certain range of each other) between the historical and real time mobility information, the higher the accuracy of the prediction may be.

At block 1520, the device 805 may measure a current channel condition if the determined level of accuracy satisfies a threshold, such a falling below a set or determined confidence level.

At block 1525, the device 805 may adjust at least one channel parameter for wireless communications of the mobile device (e.g. device 805 and/or mobile device 115) based at least in part on the measured current channel condition and the historical channel information.

It should be noted that the method 1500 is just one implementation and that the operations of the method 1500 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:
1. A method for wireless communication, comprising:
recognizing that a mobile device is traveling along a previously travelled path;
accessing historical channel information associated with historical mobility patterns of the mobile device, wherein the historical mobility patterns comprise patterns of another mobile device previously traveling the path;
predicting a current channel condition based at least in part on the accessed historical channel information;
determining a level of accuracy of the predicted current channel condition;
measuring a current channel condition if the determined level of accuracy satisfies a threshold; and
adjusting a modulation and coding scheme (MCS) parameter of the mobile device based at least in part on the accessed historical channel information associated with the historical mobility patterns of the mobile device, the predicted current channel condition, and the measured current channel condition.

2. The method of claim 1, further comprising:
predicting a variance in a channel condition based at least in part on the accessed historical channel information;
wherein adjusting the MCS parameter is based at least in part on the predicted variance in the channel condition.

3. The method of claim 1, further comprising:
measuring a current channel condition;
wherein adjusting the MCS parameter is based at least in part on the measured current channel condition and the accessed historical channel information.

4. The method of claim 1, wherein the historical channel information comprises at least one of channel quality information (CQI), precoding matrix information (PMI), and rank information (RI).

5. The method of claim 1, wherein the historical mobility patterns of the mobile device further comprise at least one of a time value associated with at least one geographic location, a current cell identification (ID), or at least one other cell ID in a known physical route of the mobile device.

6. The method of claim 5, wherein the historical channel information associated with the historical mobility patterns of the mobile device comprises at least one channel condition associated with the at least one of the time value associated with the at least one geographic location, the current cell ID, or the at least one other cell ID in the known physical route of the mobile device.

7. The method of claim 1, wherein the historical mobility patterns of the mobile device further comprise a physical route previously travelled by the mobile device.

8. The method of claim 1, further comprising:
adjusting at least one channel parameter for wireless communications, wherein the at least one channel parameter comprises a downlink channel parameter comprising at least one of a tone allocation or a multiple-input multiple-output (MIMO) precoding matrix.

9. The method of claim 1, further comprising:
adjusting at least one channel parameter for wireless communications, wherein the at least one channel parameter comprises an uplink channel parameter comprising a constellation size.

10. The method of claim 1, wherein the mobile device adjusts the MCS parameter.

11. The method of claim 1, wherein a base station serving the mobile device adjusts the MCS parameter.

12. The method of claim 11, wherein the base station adjusts the MCS parameter as the mobile device moves through a coverage area of the base station.

13. The method of claim 11, wherein the base station adjusts the MCS parameter further based on at least one of a current cell identification (ID) or at least one other cell ID in a known physical route of the mobile device.

14. An apparatus for wireless communications, comprising:
a processor; and
a memory in electronic communication with the processor, the memory embodying instructions, the instructions being executable by the processor to:
recognize that a mobile device is traveling along a previously travelled path;
access historical channel information associated with historical mobility patterns of the mobile device, wherein the historical mobility patterns comprise patterns of another mobile device previously traveling the path;
predict a current channel condition based at least in part on the accessed historical channel information;
determine a level of accuracy of the predicted current channel condition;
measure a current channel condition if the determined level of accuracy satisfies a threshold; and
adjust a modulation and coding scheme (MCS) parameter of the mobile device based at least in part on the accessed historical channel information associated with the historical mobility patterns of the mobile device, the predicted current channel condition, and the measured current channel condition.

15. The apparatus of claim 14, wherein the apparatus comprises at least one of:
a base station or the mobile device.

16. The apparatus of claim 14, wherein the instructions are further executable by the processor to:
predict a variance in a channel condition based at least in part on the accessed historical channel information;
wherein adjusting the MCS parameter is based at least in part on the predicted variance in the channel condition.

17. The apparatus of claim 14, wherein the instructions are further executable by the processor to:
measure a current channel condition;
wherein adjusting the MCS parameter is based at least in part on the measured current channel condition and the accessed historical channel information.

18. The apparatus of claim 14, wherein the historical mobility patterns of the mobile device further comprise at least one of a time value associated with at least one geographic location, a current cell identification (ID), or at least one other cell ID in a known physical route of the mobile device.

19. An apparatus for wireless communications, comprising:
means for recognizing that a mobile device is traveling along a previously travelled path;
means for accessing historical channel information associated with historical mobility patterns of the mobile device, wherein the historical mobility patterns comprise patterns of another mobile device previously traveling the path;
means for predicting a current channel condition based at least in part on the accessed historical channel information;
means for determining a level of accuracy of the predicted current channel condition;
means for measuring a current channel condition if the determined level of accuracy satisfies a threshold; and
means for adjusting a modulation and coding scheme (MCS) parameter for wireless communications of the mobile device based at least in part on the accessed historical channel information associated with the historical mobility patterns of the mobile device, the predicted current channel condition, and the measured current channel condition.

20. The apparatus of claim 19, wherein the apparatus comprises at least one of:
a base station or the mobile device.

21. The apparatus of claim 19, further comprising:
means for predicting a variance in a channel condition based at least in part on the accessed historical channel information;
wherein the means for adjusting the MCS parameter uses the predicted variance in the channel condition to adjust the MCS parameter of the mobile device.

22. The apparatus of claim 19, wherein the historical mobility patterns of the mobile device comprise at least one of a time value associated with at least one geographic location, a current cell identification (ID), or at least one other cell ID in a known physical route of the mobile device.

23. A non-transitory computer-readable storage medium comprising instructions executable by a processor to:
recognize that a mobile device is traveling along a previously travelled path;
access historical channel information associated with historical mobility patterns of the mobile device, wherein the historical mobility patterns comprise patterns of another mobile device previously traveling the path;
predict a current channel condition based at least in part on the accessed historical channel information;
determine a level of accuracy of the predicted current channel condition;
measure a current channel condition if the determined level of accuracy satisfies a threshold; and
adjust a modulation and coding scheme (MCS) parameter of the mobile device based at least in part on the accessed historical channel information associated with the historical mobility patterns of the mobile device, the predicted current channel condition, and the measured current channel condition.

* * * * *